(12) United States Patent
Yuan et al.

(10) Patent No.: US 10,097,386 B2
(45) Date of Patent: Oct. 9, 2018

(54) METHOD AND DEVICE FOR MULTIUSER SUPERPOSITION TRANSMISSION, AND METHOD AND DEVICE FOR DEMODULATING MULTIUSER INFORMATION TRANSMISSION

(71) Applicant: ZTE Corporation, Shenzhen (CN)

(72) Inventors: Zhifeng Yuan, Shenzhen (CN); Jianqiang Dai, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 15/522,492

(22) PCT Filed: Jul. 7, 2015

(86) PCT No.: PCT/CN2015/083474
§ 371 (c)(1),
(2) Date: Apr. 27, 2017

(87) PCT Pub. No.: WO2016/065921
PCT Pub. Date: May 6, 2016

(65) Prior Publication Data
US 2017/0317864 A1 Nov. 2, 2017

(30) Foreign Application Priority Data

Oct. 27, 2014 (CN) .......................... 2014 1 0583848

(51) Int. Cl.
*H04L 27/04* (2006.01)
*H04L 27/26* (2006.01)

(52) U.S. Cl.
CPC .......... *H04L 27/04* (2013.01); *H04L 27/2604* (2013.01)

(58) Field of Classification Search
CPC ............... H04L 27/3488; H04L 5/0037; H04L 27/2604; H04L 27/04
(Continued)

(56) References Cited

U.S. PATENT DOCUMENTS

2007/0268977 A1* 11/2007 Wang .................... H04L 5/0007
375/261
2009/0042511 A1* 2/2009 Malladi ................... H04L 5/023
455/62

(Continued)

FOREIGN PATENT DOCUMENTS

| CN | 101541011 A | 9/2009 |
| CN | 101627583 A | 1/2010 |

(Continued)

OTHER PUBLICATIONS

International Search Report for corresponding application PCT/CN2015/083474 filed on Jul. 7, 2015; dated Sep. 30, 2015.

(Continued)

*Primary Examiner* — Khai Tran
(74) *Attorney, Agent, or Firm* — Cantor Colburn LLP

(57) ABSTRACT

The embodiments of disclosure disclose a method and device for multiuser superposition transmission and a method and device for demodulating multiuser information transmission. In the method, two bit information streams are respectively modulated into a first complex symbol sequence and a second complex symbol sequence; superposition processing on the first complex symbol sequence and the second complex symbol sequence is performed to generate a third complex symbol sequence, wherein the third complex symbol sequence has a Gray mapping attribute; and a sending signal is formed according to the third complex symbol sequence, and the sending signal is sent to multiple receivers.

18 Claims, 10 Drawing Sheets

(58) Field of Classification Search
USPC .......... 375/300, 319; 370/310; 714/748, 801
See application file for complete search history.

(56) References Cited

U.S. PATENT DOCUMENTS

| | | |
|---|---|---|
| 2010/0046644 A1 | 2/2010 | Mazet |
| 2010/0195526 A1 | 8/2010 | Stauffer et al. |
| 2012/0140846 A1* | 6/2012 | Golitschek ............ H04L 1/1893 |
| | | 375/295 |
| 2015/0156050 A1* | 6/2015 | Nishimoto .......... H04L 27/3416 |
| | | 370/207 |

FOREIGN PATENT DOCUMENTS

| | | |
|---|---|---|
| CN | 104158631 A | 11/2014 |
| WO | 2014030501 A1 | 2/2014 |

OTHER PUBLICATIONS

Extended European Search Report dated Oct. 4, 2017 re: Application No. 15854456.9 (PCT/CN2015/083474); pp. 1-9; citing: U.S. Pat. No. 2010/046644 A1, U.S. Pat. No. 2010/195526 A1, Yuya Saito et al. "Non-Orthogonal .. .", S. Vanka et al. "Superpostion . . .".

S. Vanka et al. "Superposition Coding Strategies: Design and Experimental valuation", IEEE Transactions on Wireless Communications, Jul. 1, 2012, vol. 11, No. 7, pp. 2628-2639.

Yuya Saito et al. "Non-Orthogonal Multiple Access (NOMA) for Cellular Future Radio Access", IEEE 77th Vehicular Technology Conference (VTC Spring), Jun. 1, 2013, pp. 1-5.

* cited by examiner

— METHOD AND DEVICE FOR MULTIUSER SUPERPOSITION TRANSMISSION, AND METHOD AND DEVICE FOR DEMODULATING MULTIUSER INFORMATION TRANSMISSION

TECHNICAL FIELD

The disclosure relates to the field of communications, and in particular to a method and device for multiuser superposition transmission and a method and device for demodulating multiuser information transmission.

BACKGROUND

A multiuser information transmission technology, or called as a multiple access technology, may be divided into Orthogonal Multiple Access (OMA) and None Orthogonal Multiple Access (NOMA). Conventional Time Division Multiple Access (TDMA), orthogonal Code Division Multiple Access (CDMA) and Orthogonal Frequency Division Multiple Access (OFDMA) all belong to a scope of OMA technologies. In an OMA technology, each user communicates by virtue of strictly mutually orthogonal "sub-channels", so that there is no interference between information of each user during demodulation, and it is relatively easy to further separate user information. Relatively, in an NOMA technology, information of each user is transmitted on "the whole channel", and there is interference between information of each user during demodulation, so that it is relatively troublesome to separate the user information.

An NOMA technology may usually be divided into two demodulation methods.

A first method: each user performs demodulation with interference of another user, and such a method is relatively easy to implement but unfavorable for performance.

A second method: an interference cancellation technology, i.e. a multiuser detection technology is used.

Simple descriptions will be made below with a Successive Interference Cancellation (SIC) process of two users as an example. A multiuser SIC process is easy to popularize like this: information of a user A is demodulated and decoded at first (information of the user A is demodulated and decoded with interference of a user B; and then, when information of the user B is demodulated, it is necessary to subtract the demodulated and decoded information of the user A (reconstruction may be required), and then the information of the user B is demodulated. In such a manner, there is no interference to the information of the user B, so that performance may be greatly improved. In the related art, ultimate multiuser information capacity may be achieved by combining NOMA and SIC technologies.

What will be described next is a superposition coding technology in a downlink multiuser information transmission system in a wireless communication system. FIG. 1 is a schematic diagram of NOMA downlink broadcasting according to the related art. As shown in FIG. 1, downlink multiuser information transmission is usually called as downlink broadcasting, and refers to that a sender may send respective desired information to multiple receivers in a non-orthogonal manner. Here, it is important to note that multiuser "multicast" refers to that different information of different users is sent out together through a Base Station (BS), which is different from that the BS sends the same information to all users during conventional broadcasting (for example: radio broadcasting).

FIG. 2 is a schematic diagram of capacity comparison between an NOMA manner and an OMA manner according to the related art. As shown in FIG. 2, a downlink multiuser information transmission technology (downlink broadcasting) includes two access manners, i.e. the NOMA manner and the OMA manner. The NOMA manner may achieve system capacity or edge throughput higher than the OMA manner because each user may use all degrees of freedom. Particularly, NOMA downlink broadcasting may improve capacity of an edge user more preferably and substantially maintain high throughput of a center user at the same time. During broadcasting for NOMA, before being sent, signals of multiple users are superposed and then sent on the same time-frequency resource. A process of superposing signals of the multiple users is also called as "superposition coding".

Directly adding signals of multiple users is simplest "superposition coding", and this simplest direct addition superposition coding manner may be combined with codeword-level SIC to achieve a downlink multiuser channel capacity limit. However, in this simplest direct addition superposition coding manner, finally combined constellation points do not have a Gray mapping attribute (adjacent mapped constellation points have only one different bit, so that optimal demodulation performance is achieved). FIG. 3 is a schematic diagram of direct superposition coding for signals of multiple users according to the related art. A constellation formed by directly superposing Quadrature Phase Shift Keying (QPSK) symbols and QPSK symbols is shown in FIG. 3. If a terminal adopts simple symbol-level SIC reception, demodulation performance may be greatly reduced. Therefore, for ensuring the performance, the terminal is required to use complex codeword-level SIC. For the terminal, codeword-level SIC may cause very high implementation complexity, power consumption and time delay, and these sometimes are unacceptable for the terminal.

Hierarchical modulation may be considered as a variant of superposition coding. The hierarchical modulation refers to combining a high-priority bit stream and a low-priority bit stream to form a superposed modulated symbol. Although the hierarchical modulation may combine a constellation with a Gray mapping attribute, the hierarchical modulation is inflexible in allocation of different power to different data streams, and implementation complexity of the hierarchical modulation is relatively high. Allocating different power to different data streams is a necessary means for achieving downlink multiuser channel capacity.

From the above, a constellation point finally combined by directly adding signals of multiple users does not have a Gray mapping attribute in the related art.

SUMMARY

Embodiments of the disclosure provide a method and device for multiuser superposition transmission and a method and device for demodulating multiuser information transmission, so as to at least solve the problem that a constellation point finally combined by directly adding signals of multiple users does not have a Gray mapping attribute in the related art.

In an embodiment of the disclosure, a method for multiuser superposition transmission is provided.

The method for multiuser superposition transmission according to the embodiment of the disclosure may include: respectively modulating two bit information streams into a first complex symbol sequence and a second complex symbol sequence; performing superposition processing on the first complex symbol sequence and the second complex symbol sequence to generate a third complex symbol sequence, wherein the third complex symbol sequence has a Gray mapping attribute; and forming a sending signal according to the third complex symbol sequence, and sending the sending signal to multiple receivers.

In an example embodiment, respectively modulating the two bit information streams into the first complex symbol sequence and the second complex symbol sequence includes: multiplying a power-normalized modulated symbol sequence, which is obtained by performing a power normalization constellation diagram modulation on a first information stream in the two bit information streams, by a first power factor to obtain the first complex symbol sequence; and multiplying a power-normalized modulated symbol sequence, which is obtained by performing the power normalization constellation diagram modulation on a second information stream in the two bit information streams, by a second power factor to obtain the second complex symbol sequence, wherein a length of the first complex symbol sequence includes 1, a length of the second complex symbol sequence includes 1, the first power factor is greater than the second power factor, and a modulation order of the first complex symbol sequence is lower than or equal to a modulation order of the second complex symbol sequence.

In an example embodiment, performing, according to the first complex symbol sequence and the second complex symbol sequence, superposition processing to generate the third complex symbol sequence includes: changing, according to the first complex symbol sequence, an argument of the second complex symbol sequence in a complex plane and keeping an amplitude unchanged to acquire a changed symbol sequence; and performing superposition processing on the first complex symbol sequence and the changed symbol sequence to generate the third complex symbol sequence.

In an example embodiment, changing the second complex symbol sequence to acquire the changed symbol sequence includes: determining at least one real symbol of the changed symbol sequence according to a real value of the first complex symbol sequence; and determining at least one imaginary symbol of the changed symbol sequence according to an imaginary value of the first complex symbol sequence.

In an example embodiment, performing superposition processing on the first complex symbol sequence and the changed symbol sequence to generate the third complex symbol sequence includes one of the followings: $\sqrt{P1}\cdot(x1+y1\cdot i)+\sqrt{P2}\cdot[(-1)^{\lceil Xstd/2 \rceil}\cdot x2+(-1)^{\lceil Ystd/2 \rceil}\cdot y2\cdot i]$; and $\sqrt{P1}\cdot(x1+y1\cdot i)+\sqrt{P2}\cdot[(-1)^{\lfloor Xstd/2 \rfloor}\cdot x2+(-1)^{\lfloor Ystd/2 \rfloor}\cdot y2\cdot i]$, wherein $\sqrt{P1}\cdot(x1+y1\cdot i)$ is the first complex symbol sequence, $\sqrt{P2}\cdot(x2+y2\cdot i)$ is the second complex symbol sequence, $\sqrt{P2}\cdot[(-1)^{\lceil Ystd/2 \rceil}\cdot y2\cdot i]$ or $\sqrt{P2}\cdot[(-1)^{\lfloor Xstd/2 \rfloor}\cdot x2+(-1)^{\lfloor Ystd/2 \rfloor}\cdot y2\cdot i]$ is the changed symbol sequence, $Xstd+Ystd\cdot i$ is an unnormalized integral lattice point constellation symbol corresponding to the first complex symbol sequence, and includes: an Xstd value corresponding to Binary Phase Shift Keying (BPSK) includes one of: {1,−1} and a Ystd value corresponding to the BPSK is 0, an Xstd value and a Ystd value corresponding to Quadrature Phase Shift Keying (QPSK) include one of: {1,−1}, an Xstd value and a Ystd value corresponding to 16 Quadrature Amplitude Modulation (16 QAM) include one of: {1,−1,3,−3} and an Xstd and a Ystd value corresponding to 64 QAM include one of: {1,−1,3,−3,5,−5,7,−7}, $\sqrt{P1}$ is the first power factor, $\sqrt{P2}$ is the second power factor, $\lceil \cdot \rceil$ represents rounding up, and $\lfloor \cdot \rfloor$ represents rounding down.

In an example embodiment, the method further includes: regulating the third complex symbol sequence by regulating at least one of the first power factor and the second power factor; or, regulating a constellation diagram mapped by the third complex symbol sequence by regulating at least one of the first power factor and the second power factor.

In an example embodiment, before respectively modulating the two bit information streams into the first complex symbol sequence and the second complex symbol sequence, the method further includes: determining, according to a channel condition, a coding and modulation manner to perform coding processing on two user information streams to generate the two bit information streams, wherein a protection priority of a first user information stream in the two user information streams is higher than a protection priority of a second user information stream in the two user information streams.

In another embodiment of the disclosure, a method for demodulating multiuser information transmission is provided.

The method for demodulating multiuser information transmission according to the embodiment of the disclosure may include: receiving a sending signal from a sender, wherein the sending signal is formed according to a third complex symbol sequence after two bit information streams are respectively modulated into a first complex symbol sequence and a second complex symbol sequence and superposition processing is performed on the first complex symbol sequence and the second complex symbol sequence to generate the third complex symbol sequence on the sender, and the third complex symbol sequence has a Gray mapping attribute; and demodulating the received signal according to a demodulation manner corresponding to a type of a user.

In an example embodiment, demodulating the received signal according to the demodulation manner corresponding to the type of the user includes: when determining the type of the user is an edge user in a cell, demodulating a first part of signal to be sent to the edge user in the cell from the received signal containing an interference signal; and decoding user information desired for the edge user in the cell from the first part of signal.

In an example embodiment, demodulating the received signal according to the demodulation manner corresponding to the type of the user includes: when determining the type of the user is a center user in the cell, demodulating a first part of signal to be sent to an edge user in the cell from the received signal containing an interference signal; removing the first part of signal in the received signal, and demodulating a second part of signal to be sent to the center user in the cell from a rest part of signal; changing, according to the first part of signal, an argument of the second part of signal in a complex plane and keeping an amplitude unchanged to obtain a changed second part of signal; and decoding user information corresponding to the center user in the cell from the changed second part of signal.

In an example embodiment, a time-frequency resource of a channel used for transmitting the sending signal is the same and overlapped for use.

In another embodiment of the disclosure, a device for multiuser superposition transmission is provided.

The device for multiuser superposition transmission according to the embodiment of the disclosure may include: a modulation component, arranged to respectively modulate two bit information streams into a first complex symbol sequence and a second complex symbol sequence; a superposition component, arranged to perform superposition processing on the first complex symbol sequence and the second complex symbol sequence to generate a third complex symbol sequence, wherein the third complex symbol sequence has a Gray mapping attribute; and a sending component, arranged to form a sending signal according to the third complex symbol sequence, and send the sending signal to multiple receivers.

In an example embodiment, the modulation component includes: a first modulation element, arranged to multiply a power-normalized modulated symbol sequence, which is obtained by performing a power normalization constellation diagram modulation on a first information stream in the two bit information streams, by a first power factor to obtain the first complex symbol sequence; and a second modulation element, arranged to multiply a power-normalized modulated symbol sequence, which is obtained by performing the power normalization constellation diagram modulation on a second information stream in the two bit information streams, by a second power factor to obtain the second complex symbol sequence, wherein a length of the first complex symbol sequence includes 1, a length of the second complex symbol sequence includes 1, the first power factor is greater than the second power factor, and a modulation order of the first complex symbol sequence is lower than or equal to a modulation order of the second complex symbol sequence.

In an example embodiment, the superposition component includes: an acquisition element, arranged to change, according to the first complex symbol sequence, an argument of the second complex symbol sequence in a complex plane and keep an amplitude unchanged to acquire a changed symbol sequence; and a superposition element, arranged to perform superposition processing on the first complex symbol sequence and the changed symbol sequence to generate the third complex symbol sequence.

In an example embodiment, the acquisition element includes: a first acquisition subelement, arranged to determine at least one real symbol of the changed symbol sequence according to a real value of the first complex symbol sequence; and a second acquisition subelement, arranged to determine at least one imaginary symbol of the changed symbol sequence according to an imaginary value of the first complex symbol sequence.

In an example embodiment, the superposition coding element is arranged to perform superposition processing on the first complex symbol sequence and the changed symbol sequence to generate the third complex symbol sequence, including one of the followings: $\sqrt{P1} \cdot (x1+y1 \cdot i) + \sqrt{P2} \cdot [(-1)^{\lceil Xstd/2 \rceil} \cdot x2 + (-1)^{\lceil Ystd/2 \rceil} \cdot y2 \cdot i]$; and $\sqrt{P1} \cdot (x1+y1 \cdot i) + \sqrt{P2} \cdot [(-1)^{\lfloor Xstd/2 \rfloor} \cdot x2 + (-1)^{\lfloor Ystd/2 \rfloor} \cdot y2 \cdot i]$, wherein $\sqrt{P1} \cdot (x1+y1 \cdot i)$ is the first complex symbol sequence, $\sqrt{P2} \cdot (x2+y2 \cdot i)$ is the second complex symbol sequence, $\sqrt{P2} \cdot [(-1)^{\lceil Xstd/2 \rceil} \cdot x2 + x2 + (-1)^{\lceil Ystd/2 \rceil} \cdot y2 \cdot i]$ or $\sqrt{P2} \cdot [(-1)^{\lfloor Xstd/2 \rfloor} \cdot x2 + (-1)^{\lfloor Ystd/2 \rfloor} \cdot y2 \cdot i]$ is the changed symbol sequence, $Xstd+Ystd \cdot i$ is an unnormalized integral lattice point constellation symbol corresponding to the first complex symbol sequence, and includes: an Xstd value corresponding to Binary Phase Shift Keying (BPSK) includes one of: $\{1,-1\}$ and a Ystd value corresponding to the BPSK is 0, an Xstd value and a Ystd value corresponding to Quadrature Phase Shift Keying (QPSK) include one of: $\{1,-1\}$, an Xstd value and a Ystd value corresponding to 16 Quadrature Amplitude Modulation (16 QAM) include one of: $\{1,-1,3,-3\}$ and an Xstd and a Ystd value corresponding to 64 QAM include one of: $\{1,-1,3,-3,5,-5,7,-7\}$, $\sqrt{P1}$ is the first power factor, $\sqrt{P2}$ is the second power factor, $\lceil \cdot \rceil$ represents rounding up, and $\lfloor \cdot \rfloor$ represents rounding down.

In an example embodiment, the device further includes: a regulation component, arranged to regulate the third complex symbol sequence by regulating at least one of the first power factor and the second power factor; or, regulate a constellation diagram mapped by the third complex symbol sequence by regulating at least one of the first power factor and the second power factor.

In an example embodiment, the device further includes: a generation component, arranged to determine, according to a channel condition, a coding and modulation manner to perform coding processing on two user information streams to generate the two bit information streams, wherein a protection priority of a first user information stream in the two user information streams is higher than a protection priority of a second user information stream in the two user information streams.

In another embodiment of the disclosure, a device for demodulating multiuser information transmission is provided.

The device for demodulating multiuser information transmission according to the embodiment of the disclosure may include: a receiving component, arranged to receive a sending signal from a sender, wherein the sending signal is formed according to a third complex symbol sequence after two bit information streams are respectively modulated into a first complex symbol sequence and a second complex symbol sequence and superposition processing is performed on the first complex symbol sequence and the second complex symbol sequence to generate the third complex symbol sequence on the sender, and the third complex symbol sequence has a Gray mapping attribute; and a demodulation component, arranged to demodulate the received signal according to a demodulation manner corresponding to a type of a user.

In an example embodiment, the demodulation component includes: a first demodulation element, arranged to, when determining the type of the user is an edge user in a cell, demodulate a first part of signal to be sent to the edge user in the cell from the received signal containing an interference signal; and a first decoding element, arranged to decode user information corresponding to the edge user in the cell from the first part of signal.

In an example embodiment, the demodulation component includes: a second demodulation element, arranged to, when determining the type of the user is a center user in the cell, demodulate a first part of signal to be sent to an edge user in the cell from the received signal containing an interference signal; a third demodulation element, arranged to remove the first part of signal in the received signal, and demodulate a second part of signal to be sent to the center user in the cell from a rest part of signal; a processing element, arranged to change, according to the first part of signal, an argument of the second part of signal in a complex plane and keep an amplitude unchanged to obtain a changed second part of signal; and a second decoding element, arranged to decode user information corresponding to the center user in the cell from the changed second part of signal.

In an example embodiment, a time-frequency resource of a channel used for transmitting the sending signal is the same and overlapped for use.

According to at least one embodiment of the disclosure, the two bit information streams are respectively modulated into the first complex symbol sequence and the second complex symbol sequence; superposition processing on the first complex symbol sequence and the second complex symbol sequence is performed to generate the third complex symbol sequence, wherein the third complex symbol sequence has the Gray mapping attribute; and the sending signal is formed according to the third complex symbol sequence, and the sending signal is sent to the multiple receivers. The problem that the constellation point finally combined by directly adding signals of multiple users does not have the Gray mapping attribute in the related art is solved. An SIC receiver in an NOMA downlink broadcasting communication system is further simplified, so that the receiver may perform symbol-level SIC demodulation as much as possible. Meanwhile, superposed symbols have the Gray attribute. Moreover, different power may be simply and flexibly allocated to different data streams, and multiple access performance is improved.

BRIEF DESCRIPTION OF THE DRAWINGS

The drawings described here are adopted to provide a further understanding to the disclosure, and form a part of the disclosure. Schematic embodiments of the disclosure and descriptions thereof are adopted to explain the disclosure and not intended to form improper limits to the disclosure. In the drawings.

DETAILED DESCRIPTION

The disclosure will be described below in detail with reference to the drawings and embodiments. It needs to be noted that the embodiments in the disclosure and characteristics in the embodiments may be combined under the condition of no conflicts.

Figure 4:
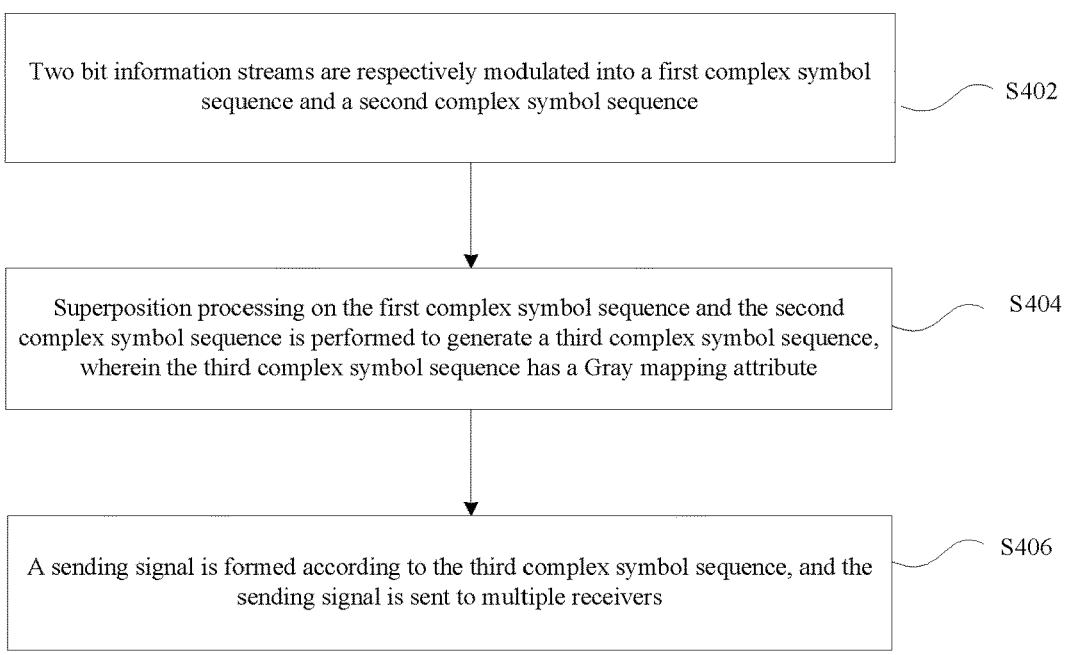
FIG. 4 is a flowchart of a method for multiuser superposition transmission according to an embodiment of the disclosure.

FIG. 4 is a flowchart of a method for multiuser superposition transmission according to an embodiment of the disclosure. As shown in FIG. 4, the method may include the following processing steps:

Step S402: two bit information streams are respectively modulated into a first complex symbol sequence and a second complex symbol sequence;

Step S404: superposition processing on the first complex symbol sequence and the second complex symbol sequence is performed to generate a third complex symbol sequence, wherein the third complex symbol sequence has a Gray mapping attribute; and Step S406: a sending signal is formed according to the third complex symbol sequence, and the sending signal is sent to multiple receivers.

A constellation point finally combined by directly adding signals of multiple users does not have the Gray mapping attribute in the related art. By adopting the method shown in FIG. 4, a sender may perform corresponding changing processing on a constellation of a center user for superposition processing and then form a sending signal by superposed symbols for sending to a receiver of an edge user in a cell and a receiver of the center user. Therefore, for an NOMA downlink broadcasting system, a receiver may perform symbol-level SIC demodulation, and the SIC receiver is greatly simplified; in addition, the superposed symbols have the Gray attribute; and moreover, different power may be simply and flexibly allocated to different data streams, multiple access performance is improved, and particularly, performance of the center user in the cell is improved.

It needs to be noted that the superposition solution for a downlink multiuser information transmission system provided by the embodiments of the disclosure may support a downlink broadcasting system of an old version.

In an example embodiment, respectively modulating the two bit information streams into the first complex symbol sequence and the second complex symbol sequence in Step 5402 may include the following operations:

Step S1: a power-normalized modulated symbol sequence, which is obtained by performing a power normalization constellation diagram modulation on a first information stream in the two bit information streams, is multiplied by a first power factor to obtain the first complex symbol sequence; and Step S2: a power-normalized modulated symbol sequence, which is obtained by performing a power normalization constellation diagram modulation on a second information stream in the two bit information streams, is multiplied by a second power factor to obtain the second complex symbol sequence, wherein a length of the first complex symbol sequence includes 1, a length of the second complex symbol sequence includes 1, the first power factor is greater than the second power factor, and a modulation order of the first complex symbol sequence is lower than or equal to a modulation order of the second complex symbol sequence.

A complex symbol sequence S1 is obtained by multiplying a power-normalized modulated symbol sequence, which is obtained by performing the power normalization constellation diagram modulation on coded bits C1, by a power factor. A complex symbol sequence S2 is obtained by multiplying a power-normalized modulated symbol sequence, which is obtained by performing the power normalization constellation diagram modulation on coded bits C2 by a power factor. The complex symbol sequence S1, obtained by modulating coded bits C1, with certain power is $\sqrt{P1}\cdot(x1+y1\cdot i)$, and the complex symbol sequence S2, obtained by modulating coded bits C2, with certain power is $\sqrt{P2}\cdot(x2+y2\cdot i)$. The power factor of S1 is $\sqrt{P1}$, and the power factor of S2 is $\sqrt{P2}$. When $\sqrt{P1}$ is less than or equal to $\sqrt{P2}$, it is unnecessary to perform constellation changing on the symbol sequence S2.

In an example embodiment, performing, according to the first complex symbol sequence and the second complex symbol sequence, superposition processing to generate the third complex symbol sequence in Step S404 may include the following steps:

Step S3: an argument of the second complex symbol sequence in a complex plane is changed according to the first complex symbol sequence and an amplitude is kept unchanged to acquire a changed symbol sequence; and Step S4: superposition processing is performed on the first complex symbol sequence and the changed symbol sequence to generate the third complex symbol sequence.

Superposition of the complex symbol sequences S1 and S2 may be direct superposition of the complex symbol sequence S1 and a changed symbol sequence S of the complex symbol sequence S2, and a complex symbol sequence S3 obtained by direct superposition may be represented as (S1+S). S1 is directly superposed with changed symbols of S2 to obtain S3. Constellation points of S3 have the Gray attribute, and a superposed symbol constellation may be endowed with the Gray attribute by another method.

In an example embodiment, changing the second complex symbol sequence to acquire the changed symbol sequence in Step S3 may include the following operations:

Step S31: at least one real symbol of the changed symbol sequence is determined according to a real value of the first complex symbol sequence; and Step S32: at least one imaginary symbol of the changed symbol sequence is determined according to an imaginary value of the first complex symbol sequence.

The changing processing is required before superposition processing of the complex symbol sequences S2 and S1. The at least one real symbol of S is determined according to a real value of S1, and the at least one imaginary symbol of S is determined according to an imaginary value of S1. The changed symbol sequence S of the complex symbol sequence S2 may be represented as: $\sqrt{P2}\cdot[(-1)^{\lfloor Xstd/2 \rfloor}\cdot x2+(-1)^{\lceil Ystd/2 \rceil}\cdot y2\cdot i]$ or $\sqrt{P2}\cdot[(-1)^{\lceil Xstd/2 \rceil}\cdot x2+(-1)^{\lfloor Ystd/2 \rfloor}\cdot y2\cdot i]$;

moreover, power of the symbol sequence S is the same as power of S2.

In an example embodiment, performing superposition processing on the first complex symbol sequence and the changed symbol sequence to generate the third complex symbol sequence in Step S4 may include one of the following manners:

a first manner: the third complex symbol sequence is $\sqrt{P1}\cdot(x1+y1\cdot i)+\sqrt{P2}\cdot[(-1)^{\lfloor Xstd/2 \rfloor}\cdot x2+(-1)^{\lceil Ystd/2 \rceil}\cdot y2\cdot i]$; and a second manner: the third complex symbol sequence is $\sqrt{P1}\cdot(x1+y1\cdot i)+\sqrt{P2}\cdot[(-1)^{\lceil Xstd/2 \rceil}\cdot x2+(-1)^{\lfloor Ystd/2 \rfloor}\cdot y2\cdot i]$, in which $\sqrt{P1}\cdot(x1+y1\cdot i)$ is the first complex symbol sequence, $\sqrt{P2}\cdot(x2+y2\cdot i)$ is the second complex symbol sequence, $\sqrt{P2}\cdot[(-1)^{\lfloor Xstd/2 \rfloor}\cdot x2+(-1)^{\lceil Ystd/2 \rceil}\cdot y2\cdot i]$ or $\sqrt{P2}\cdot[(-1)^{\lceil Xstd/2 \rceil}\cdot x2+(-1)^{\lfloor Ystd/2 \rfloor}\cdot y2\cdot i]$ is the changed symbol sequence, Xstd+Ystd·i is an unnormalized integral lattice point constellation symbol corresponding to the first complex symbol sequence, and includes: an Xstd value corresponding to Binary Phase Shift Keying (BPSK) includes one of: {1,−1} and a Ystd value corresponding to the BPSK is 0, an Xstd value and a Ystd value corresponding to Quadrature Phase Shift Keying (QPSK) include one of: {1,−1}, an Xstd value and a Ystd value corresponding to 16 Quadrature Amplitude Modulation (16 QAM) include one of: {1,−1,3,−3} and an Xstd and a Ystd value corresponding to 64 QAM include one of: {1,−1,3,−3,5,−5,7,−7}, $\sqrt{P1}$ is the first power factor, $\sqrt{P2}$ is the second power factor, $\lceil \cdot \rceil$ represents rounding up, and $\lfloor \cdot \rfloor$ represents rounding down.

It is supposed that the complex symbol sequence S1, obtained by modulating coded bits C1, with the certain power is $\sqrt{P1}\cdot(x1+y1\cdot i)$ the complex symbol sequence S2, obtained by modulating coded bits C2, with the certain power is $\sqrt{P2}\cdot(x2+y2\cdot i)$ and an unnormalized integral lattice point constellation symbol Sstd corresponding to S1 is Xstd+Ystd·i, and then the complex symbol sequence S3 obtained by changing and superposition of S1 and S2 may be $\sqrt{P1}\cdot(x1+y1\cdot i)+\sqrt{P2}\cdot[(-1)^{\lfloor Xstd/2 \rfloor}\cdot x2+(-1)^{\lceil Ystd/2 \rceil}\cdot y2\cdot i]$, $\sqrt{P1}$ and $\sqrt{P2}$ are the power factors, and symbol $\lceil \cdot \rceil$ represents rounding up.

The unnormalized integral lattice point constellation symbol Sstd is Xstd+Ystd·i, for example: an Xstd value and a Ystd value corresponding to QPSK comprise one of: {1,−1}, an Xstd value and a Ystd value corresponding to 16 16 QAM comprise one of: {1,−1,3,−3} and an Xstd and a Ystd value corresponding to 64 QAM comprise one of: {1,−1,3,−3,5,−5,7,−7}.

In addition, it may also be supposed that the complex symbol sequence S1, obtained by modulating coded bits C1, with the certain power is $\sqrt{P1}\cdot(x1+y1\cdot i)$, the complex symbol sequence S2, obtained by modulating coded bits C2, with the certain power is $\sqrt{P2}\cdot(x2+y2\cdot i)$ and the unnormalized integral lattice point constellation symbol Sstd corresponding to S1 is Xstd+Ystd·i, and then the complex symbol sequence S3 obtained by changing and superposition of S1 and S2 may be $\sqrt{P1}\cdot(x1+y1\cdot i)+\sqrt{P2}\cdot[(-1)^{\lceil Xstd/2 \rceil}\cdot x2+(-1)^{\lfloor Ystd/2 \rfloor}\cdot y2\cdot i]$. $\sqrt{P1}$ and $\sqrt{P2}$ are the power factors, and symbol $\lfloor \cdot \rfloor$ represents rounding down.

The unnormalized integral lattice point constellation symbol Sstd is Xstd+Ystd·i, for example: the Xstd value and the Ystd value corresponding to QPSK comprise one of: {1,−1}, an Xstd value and a Ystd value corresponding to 16 16 QAM comprise one of: {1,−1,3,−3} and an Xstd and a Ystd value corresponding to 64 QAM comprise one of: {1,−1,3,−3,5,−5,7,−7}.

In an example embodiment, the method may further include the following operation:

Step S5: the third complex symbol sequence is regulated by regulating at least one of the first power factor and the second power factor; or, a constellation diagram mapped by the third complex symbol sequence is regulated by at least one of regulating the first power factor and the third power factor.

S3 may be regulated according to the power factors $\sqrt{P1}$ and $\sqrt{P2}$, in which $\sqrt{P1}$ is larger than $\sqrt{P2}$.

In an example embodiment, before respectively modulating the two bit information streams into the first complex symbol sequence and the second complex symbol sequence in Step S402, the method may further include the following step:

Step S6: a coding and modulation manner to perform coding processing on two user information streams to generate the two bit information streams is determined according to a channel condition, wherein a protection priority of a first user information stream in the two user information streams is higher than a protection priority of a second user information stream in the two user information streams.

The two bit information streams may be obtained by coding dual information bit streams, wherein a protection priority of coded bits C1 is higher than a protection priority of coded bits C2. Coded bits C1 and coded bits C2 are modulated into the complex symbol sequences S1 and S2 with the certain power, and a modulation order of S1 is lower than or equal to a modulation order of S2. S1 and S2 are superposed to obtain modulated symbols higher than the modulation order of S1 or S2.

Figure 5:
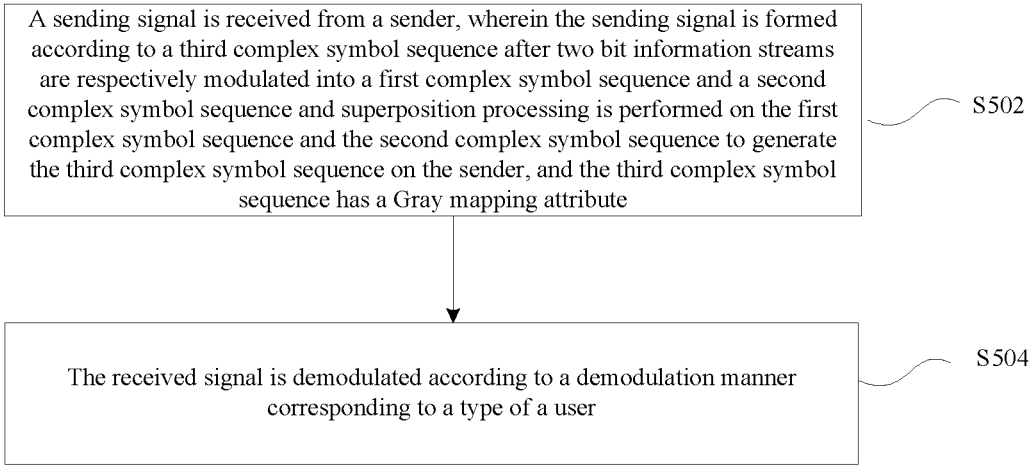
FIG. 5 is a flowchart of a method for demodulating multiuser information transmission according to an embodiment of the disclosure.

FIG. 5 is a flowchart of a method for demodulating multiuser information transmission according to an embodiment of the disclosure. As shown in FIG. 5, the method may include the following processing steps:

Step S502: a sending signal is received from a sender, wherein the sending signal is formed according to a third complex symbol sequence after two bit information streams are respectively modulated into a first complex symbol sequence and a second complex symbol sequence and superposition processing is performed on the first complex symbol sequence and the second complex symbol sequence to generate the third complex symbol sequence on the sender, and the third complex symbol sequence has a Gray mapping attribute; and Step S504: the received signal is demodulated according to a demodulation manner corresponding to a type of a user.

By adopting the method shown in FIG. 5, the problem that a constellation point finally combined by directly adding signals of multiple users does not have the Gray mapping attribute in the related art is solved. An SIC receiver in an NOMA downlink broadcasting communication system is further simplified, so that the receiver may perform symbol-level SIC demodulation as much as possible. Meanwhile, superposed symbols have the Gray attribute. Moreover, different power may be simply and flexibly allocated to different data streams, and multiple access performance is improved.

In an example embodiment, demodulating the received signal according to the demodulation manner corresponding to the type of the user in Step S504 may include the following operations:

Step S7: when determining the type of the user is an edge user in a cell, a first part of signal to be sent to the edge user in the cell is demodulated from the received signal containing an interference signal; and Step S8: user information corresponding to the edge user in the cell is decoded from the first part of signal.

That is, a receiver 1 of the edge user in the cell demodulates the information of the edge user with interference of a center user.

In an example embodiment, demodulating the received signal according to the demodulation manner corresponding to the type of the user in Step S504 may include the following steps:

Step S9: when determining the type of the user is a center user in a cell, a first part of signal to be sent to an edge user in the cell is demodulated from the received signal containing an interference signal;

Step S10: the first part of signal in the received signal is removed, and a second part of signal to be sent to the center user in the cell is demodulated from a rest part of signal;

Step S11: an argument of the second part of signal in a complex plane is changed according to the first part of signal and an amplitude is kept unchanged to obtain a changed second part of signal; and Step S12: user information corresponding to the center user in the cell is decoded from the changed second part of signal.

That is, a receiver 2 of the center user in the cell performs changing and decoding to obtain the information of the center user after demodulating and removing the edge user information.

In an example embodiment, a time-frequency resource of a channel used for transmitting the sending signal is the same and overlapped for use. The information of each user is transmitted on "the whole channel", and the whole channel refers to that time-frequency resources of multiple channels are completely the same and may be completely overlapped for use.

It is supposed that the information S1', demodulated by the receiver, of the edge user is $x1'+y1'\cdot i$, the signal obtained by demodulating and removing the information of the edge user by the receiver 2 of the center user in the cell is $x2'+y2'\cdot i$ and a standard unnormalized integral lattice point constellation symbol Sstd' corresponding to S1' is $Xstd'+Ystd'\cdot i$, and then the signal, demodulated by changing processing, of the center user may be $\sqrt{P1}\cdot(x1+y1\cdot i)+\sqrt{P2}\cdot[(-1)^{\lceil Xstd/2 \rceil}\cdot x2+(-1)^{\lceil Ystd/2 \rceil}\cdot y2\cdot i]$ or $\sqrt{P1}\cdot(x1+y1\cdot i)+\sqrt{P2}\cdot[(-1)^{\lfloor Xstd/2 \rfloor}\cdot x2+(-1)^{\lfloor Ystd/2 \rfloor}\cdot y2\cdot i]$, wherein $\lceil \cdot \rceil$ represents rounding up, and $\lfloor \cdot \rfloor$ represents rounding down.

The unnormalized integral lattice point constellation symbol Sstd' is $Xstd'+Ystd'\cdot i$, for example: the Xstd value and the Ystd value corresponding to QPSK comprise one of: $\{1,-1\}$, an Xstd value and a Ystd value corresponding to 16 16 QAM comprise one of: $\{1,-1,3,-3\}$ and an Xstd and a Ystd value corresponding to 64 QAM comprise one of: $\{1,-1,3,-3,5,-5,7,-7\}$.

The abovementioned example implementation process will be further described below with reference to example embodiment 1 to example embodiment 5.

Example Embodiment 1 (Sender)

Figure 6:
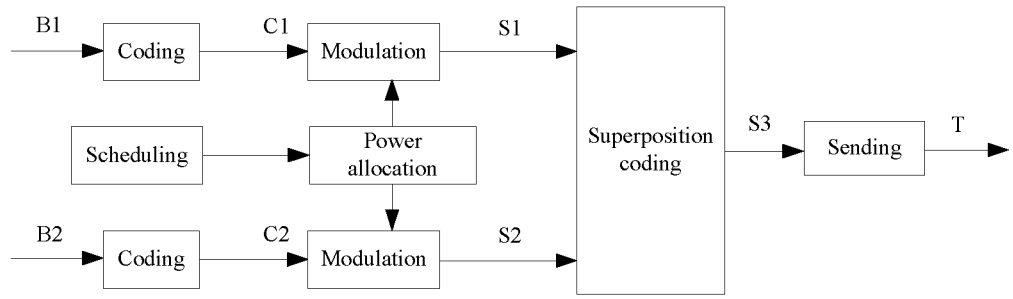
FIG. 6 is a schematic diagram of a wireless broadcasting communication system implemented by adopting a method for superposing a downlink multiuser information transmission system according to an example embodiment of the disclosure.

FIG. 6 is a schematic diagram of a wireless broadcasting communication system implemented by adopting a superposition method for a downlink multiuser information transmission system according to an example embodiment of the disclosure. As shown in FIG. 6, a BS may transmit multiuser information to two User Equipments (UEs) (i.e. UE1 and UE2).

In the BS, two bit information streams may be modulated into complex symbol sequences S1 and S2 with certain power, and a complex symbol sequence S3 is obtained by changing and superposition processing.

At first, the two bit information streams are obtained by performing Turbo coding on dual information bit streams to be sent to users, wherein a protection priority of coded bits C1 is higher than a protection priority of coded bits C2. Coded bits C1 and coded bits C2 are modulated into the complex symbol sequences S1 and S2 with the certain power, wherein a modulation order of S1 is lower than or equal to a modulation order of S2. Spectral efficiency of UE1 is required to be lower than spectral efficiency of UE2, wherein the complex symbol sequence S1 is obtained by multiplying a power-normalized modulated symbol sequence, which is obtained by performing a power normalization constellation diagram modulation on coded bits C1, by a power factor. The complex symbol sequence S2 is obtained by multiplying a power-normalized modulated symbol sequence, which is obtained by performing the power normalization constellation diagram modulation on coded bits C2, by a power factor. It is supposed that the power factor of S1 is $\sqrt{P1}$, the power factor of S2 is $\sqrt{P2}$ and $\sqrt{P1}$ is larger than $\sqrt{P2}$, and then the complex symbol sequence S1 is $\sqrt{P1} \cdot (x1+y1 \cdot i)$, the complex symbol sequence S2 is $\sqrt{P2} \cdot (x2+y2 \cdot i)$ and an unnormalized integral lattice point constellation symbol Sstd corresponding to S1 is Xstd+Ystd·i. The unnormalized integral lattice point constellation symbol Sstd is Xstd+Ystd·i, for example: the Xstd value and the Ystd value corresponding to QPSK comprise one of: {1,−1}, an Xstd value and a Ystd value corresponding to 16 16 QAM comprise one of: {1,−1,3,−3} and an Xstd and a Ystd value corresponding to 64 QAM comprise one of: {1,−1,3,−3,5,−5,7,−7}.

Then, changing and superposition processing of the complex symbol sequences S1 and S2 refers to direct superposition of the complex symbol sequence S1 and a changed symbol sequence S of the complex symbol sequence S2, and a complex symbol sequence S3 obtained by direct superposition may be represented as (S1+S), and may also be represented as $\sqrt{P1} \cdot (x1+y1 \cdot i)+\sqrt{P2} \cdot [(-1)^{\lceil Xstd'/2 \rceil} \cdot x2+(-1)^{\lceil Ystd'/2 \rceil} \cdot y2 \cdot i]$, wherein the symbol $\lceil \cdot \rceil$ represents rounding up.

S3 is regulated according to the power factors $\sqrt{P1}$ and $\sqrt{P2}$, wherein $\sqrt{P1}$ is larger than $\sqrt{P2}$.

A constellation of the superposed complex symbol sequence S3 has a Gray attribute, and the constellation of the superposed symbol sequence may be endowed with the Gray attribute by another method, wherein at least one real symbol of S may be determined according to a real value of S1 and at least one imaginary symbol of S may be determined according to an imaginary value of S1. The changed symbol sequence S of the complex symbol sequence S2 may be represented as: $\sqrt{P2} \cdot [(-1)^{\lceil Xstd'/2 \rceil} \cdot x2+(-1)^{\lceil Ystd'/2 \rceil} \cdot y2 \cdot i]$. Power of the symbol sequence S is the same as the power of S2.

Finally, the BS may form a sending signal by symbols obtained by superposition processing for sending to the edge user UE1 and center user UE2 in a cell.

Example Embodiment 2 (Receiver)

Figure 7:
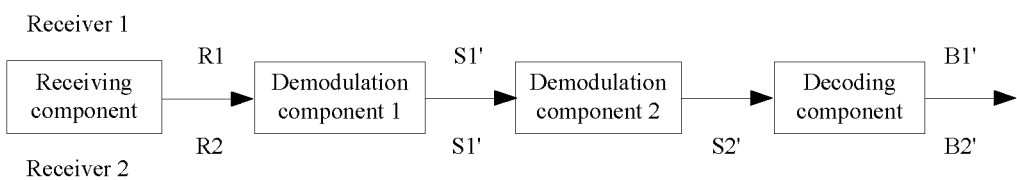
FIG. 7 is a structural schematic diagram of a typical receiver of a downlink multiuser information transmission system according to an example embodiment of the disclosure.

FIG. 7 is a structural diagram of a typical receiver of a downlink multiuser information transmission system according to an example embodiment of the disclosure. As shown in FIG. 7, the receiver may include, but not limited to: a receiving component, a demodulation component and a decoding component.

Two bit information streams are transmitted on "the whole channel", an edge user or a receiver 1 demodulates required information with other interference information, and a center user or a receiver 2 demodulates required information after demodulating interference information and removing the interference information.

On the receiver 1, the edge user receives a complex symbol sequence R1 at first, then demodulates a strong signal S1' (information to be sent to the edge user) with interference of a weak signal (information to be sent to the center user), and finally decodes information B1' of the edge user.

On the receiver 2, the center user receives R2 at first, then demodulates the strong signal S1' in the demodulation component 1, and sends the demodulated information to a demodulation component 2, and the demodulation component 2 removes the strong signal from R2, then demodulates the weak signal S2' and finally decodes information B2' of the center user. If the information, demodulated by the receiver, of the edge user is x1'+y1'·i and a complex symbol obtained by SIC demodulation is x2'+y2'·i, the signal S2' obtained by changing is: $(-1)^{\lceil Xstd''/2 \rceil} \cdot x2'+(-1)^{\lceil Ystd''/2 \rceil} \cdot y2' \cdot i$ or $(-1)^{\lfloor Xstd''/2 \rfloor} \cdot x2'+(-1)^{\lfloor Ystd''/2 \rfloor} \cdot y2' \cdot i$, wherein Sstd' is an unnormalized integral lattice point constellation symbol corresponding to S1', and is represented as Xstd'+Ystd'·i. $\lceil \cdot \rceil$ represents rounding up, and $\lfloor \cdot \rfloor$ represents rounding down. The receivers of the two users may adopt the same design, the center user is required to use two demodulation components, and the edge user is required to use a demodulation component 1.

Example Embodiment 3 (Sender Component)

Figure 8:
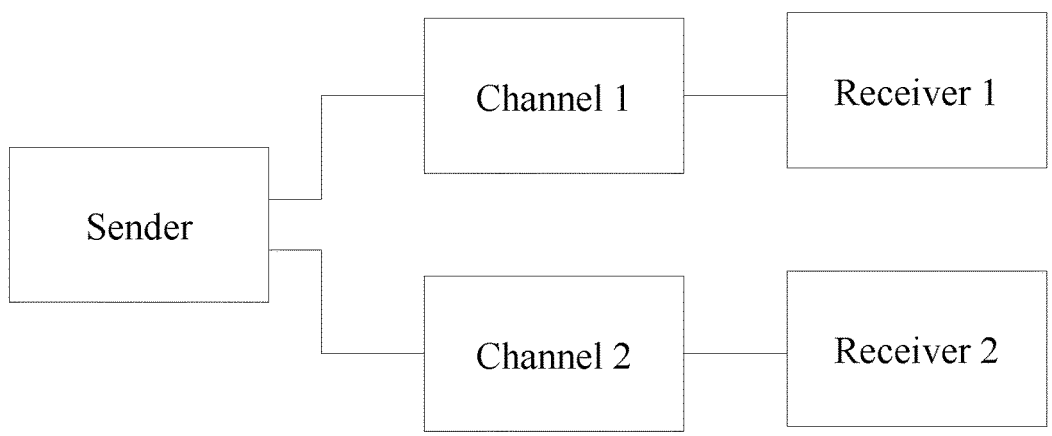
FIG. 8 is a structural schematic diagram of a device for superposing a downlink multiuser information transmission system according to an example embodiment of the disclosure.
Figure 9:
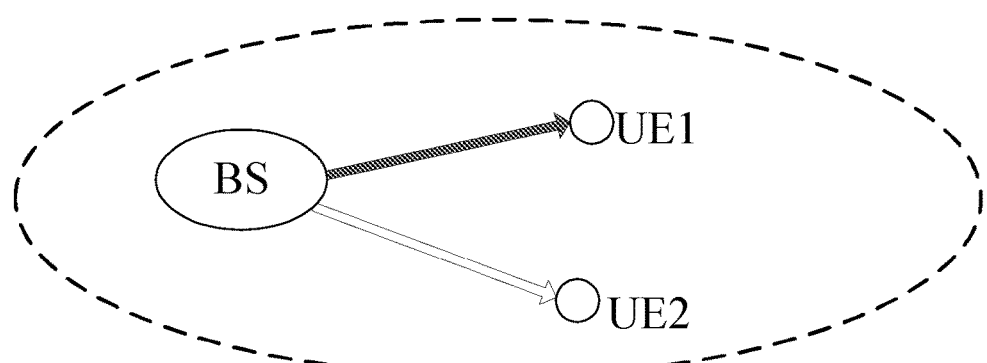
FIG. 9 is a structural schematic diagram of a sender component of a device for superposing a downlink multiuser information transmission system according to an example embodiment of the disclosure.

FIG. 8 is a structural diagram of a device for superposing a downlink multiuser information transmission system according to an example embodiment of the disclosure. FIG. 9 is a structural diagram of a sender component of a device for superposing a downlink multiuser information transmission system according to an example embodiment of the disclosure. As shown in FIG. 8 and FIG. 9, the superposition device may include, but not limited to: a sender BS, channels and receivers. A sending signal reaches a receiver 1 through a channel 1 and reaches a receiver 2 through a channel 2. The BS stores related information of the wireless channels with each receiver, and quality of the wireless channels from the BS to the receiver 1 and from the BS to the receiver 2 has a great difference, for example: a difference of 20 dB. The sender may be a BS, a relay node or a network coding node. The receivers may be mobile or fixed wireless communication equipment, and may also be called as mobile nodes, and the nodes may freely move within an effective communication range.

The sender may implement the abovementioned superposition. The sender may include, but not limited to: a coding component, a modulation component, a scheduling component, a power allocation component, a superposition component and a sending component. Two bit information streams are modulated into complex symbol sequences S1 and S2 with certain power, and a complex symbol sequence S3 is obtained by changing and superposition.

In the coding component, Turbo coding processing is performed on user information streams B1 and B2 to obtain two bit information streams coded bits C1 and coded bits C2, wherein a protection priority of coded bits C1 is higher than a protection priority of coded bits C2.

In the modulation component, complex symbol sequences, obtained by modulating coded bits C1 and coded bits C2, with normalized average power are multiplied by power factors to obtain S1 and S2, wherein a modulation order of S1 is lower than or equal to a modulation order of S2. Superposition processing is performed on S1 and S2 to obtain S3, wherein a modulation order of S3 is higher than the modulation order of S1 or S2. It is supposed that S1 obtained after coded bits C1 is processed by the modulation component is $\sqrt{P1} \cdot (x1+y1 \cdot i)$ and S2 obtained after coded bits C2 is processed by the modulation component is $\sqrt{P2} \cdot (x2+y2 \cdot i)$. The scheduling component may schedule and group the receiver 1 of an edge user and the receiver 2 of a center user.

The power allocation component may set the power factors $\sqrt{P1}$ and $\sqrt{P2}$ according to an identification signal of the scheduling component. S1 obtained by multiplying coded bits C1 modulated through a power normalization constellation diagram by the power factor is $\sqrt{P1} \cdot (x1+y1 \cdot i)$, and S2 obtained by multiplying coded bits C2 modulated through the power normalization constellation diagram by the power factor is $\sqrt{P2} \cdot (x2+y2 \cdot i)$, wherein $\sqrt{P1}$ is larger than $\sqrt{P2}$, and when $\sqrt{P1}$ is less than or equal to $\sqrt{P2}$, it is unnecessary to perform constellation changing on the symbol sequence S2.

In the superposition component, changing and superposition of the complex symbol sequences S1 and S2 refers to direct superposition of the complex symbol sequence S1 and a changed symbol sequence S of the complex symbol sequence S2, and the complex symbol sequence S3 obtained by direct superposition may be represented as (S1+S), wherein at least one real symbol of S may be determined according to a real value of S1, and at least one imaginary symbol of S may be determined according to an imaginary value of S1. The changed symbol sequence S of the complex symbol sequence S2 is represented as $(-1)^{\lfloor Xstd/2 \rfloor} \cdot x2 + (-1)^{\lfloor Ystd/2 \rfloor} \cdot y2 \cdot i$ or $(-1)^{\lfloor Xstd/2 \rfloor} \cdot y2 \cdot i$, wherein $\lceil \cdot \rceil$ represents rounding up, and $\lfloor \cdot \rfloor$ represents rounding down. Power of the symbol sequence S is the same as the power of S2. S1 and S2 are superposed to obtain the complex symbol sequence S3. A constellation of the superposed complex symbol sequence S3 has a Gray attribute, and the constellation of the superposed symbol sequence may be endowed with the Gray attribute by another method.

The sending component may form a sending signal T by superposed symbols for sending to the receiver 1 of the edge user and receiver 2 of the center user in the cell.

It needs to be noted that an application scenario with one cell is provided in the preferred embodiment and not intended to form improper limits to the disclosure. The system may also be a cellular network system with multiple cells.

Example Embodiment 4

A sender is required to transmit a first group of information to an edge user and transmit a second group of information to a center user.

At first, the first group of information and the second group of information are coded and modulated according to a code rate and modulation manner of an existing standard. For example: two bit information streams coded bits C1 and coded bits C2 are obtained by respectively performing Turbo coding on dual information bit streams to be sent to the users, wherein a protection priority of coded bits C1 is higher than a protection priority of coded bits C2. Coded bits C1 and coded bits C2 are modulated into complex symbol sequences S1 and S2 with certain power, wherein a modulation order of S1 is lower than or equal to a modulation order of S2. There may be multiple modulation manners, for example: BPSK, QPSK, 16 QAM or another existing modulation manner. Spectral efficiency of the edge user is required to be lower than spectral efficiency of the center user.

The complex symbol sequence S1 is obtained by multiplying a power-normalized modulated symbol sequence, which is obtained by performing a power normalization constellation diagram modulation on coded bits C1, by a power factor. The complex symbol sequence S2 is obtained by multiplying a power-normalized modulated symbol sequence, which is obtained by performing the power normalization constellation diagram modulation on coded bits C2, by a power factor. It is supposed that the power factors of S1 and S2 are $\sqrt{P1}$ and $\sqrt{P2}$. S1 obtained by multiplying coded bits C1 modulated through the power normalization constellation diagram by the power factor is $\sqrt{P1} \cdot (x1+y1 \cdot i)$, and S2 obtained by multiplying coded bits C2 modulated through the power normalization constellation diagram by the power factor is $\sqrt{P2} \cdot (x2+y2 \cdot i)$. $\sqrt{P1}$ is larger than $\sqrt{P2}$. When $\sqrt{P1}$ is less than or equal to $\sqrt{P2}$, it is unnecessary to perform constellation changing on the symbol sequence S2.

The power allocation component may set the power factors, for example: $\sqrt{P1}=8$ and $\sqrt{P2}=4$.

Then, changing and superposition of the complex symbol sequences S1 and S2 refers to direct superposition of the complex symbol sequence S1 and a changed symbol sequence S of the complex symbol sequence S2, and a complex symbol sequence S3 obtained by direct superposition may be represented as (S1+S), and may also be represented as $\sqrt{P1} \cdot (x1+y1 \cdot i) + \sqrt{P2} \cdot [(-1)^{\lfloor Xstd/2 \rfloor} \cdot x2 + (-1)^{\lfloor Ystd/2 \rfloor} \cdot y2 \cdot i]$, wherein the symbol $\lfloor \cdot \rfloor$ represents rounding down. A constellation of the superposed complex symbol sequence S3 has a Gray attribute, and the constellation of the superposed symbol sequence may be endowed with the Gray attribute by another method.

Figure 10:
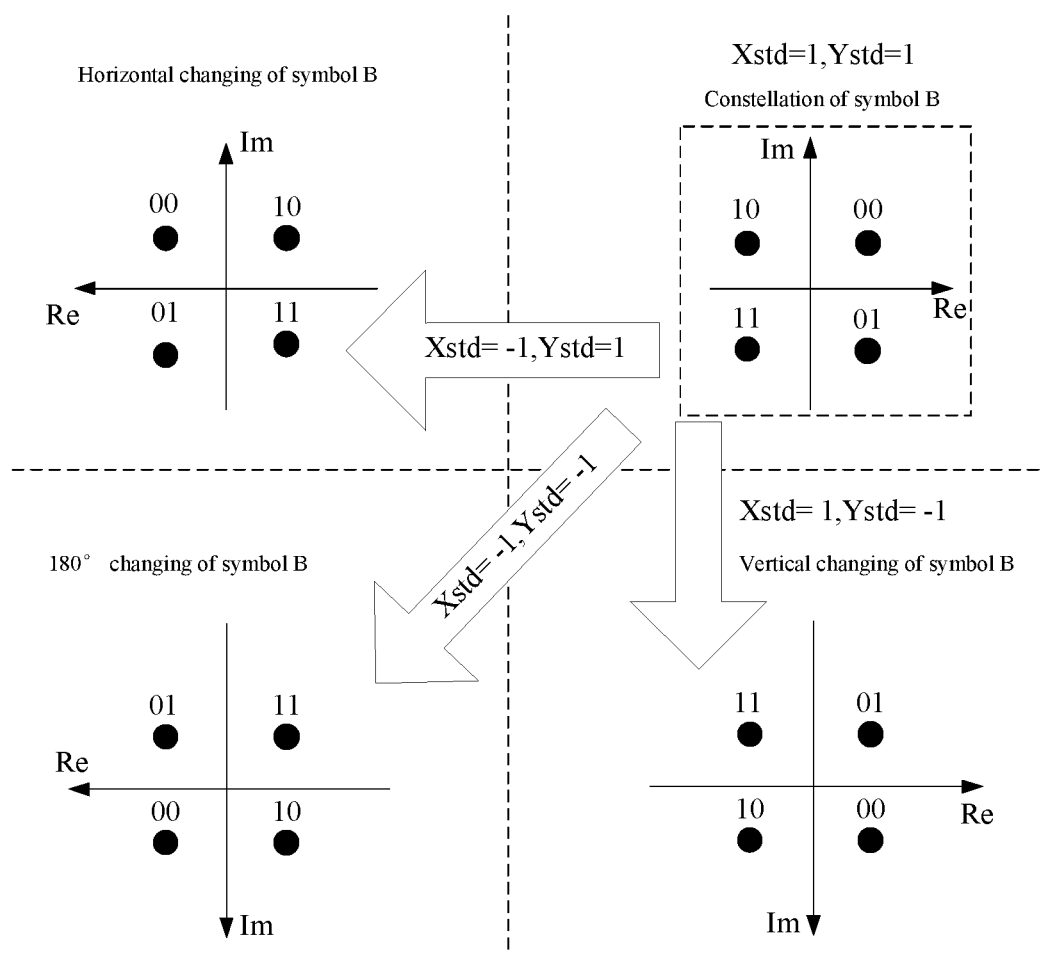
FIG. 10 is a schematic diagram of a process of performing changing processing on a QPSK signal of a center user according to an example embodiment of the disclosure.

In an example embodiment, it is supposed that QPSK modulation is adopted for both of the two groups of information according to the standard, at least one real symbol of S are determined according to a real value of S1 and at least one imaginary symbol of S are determined according to an imaginary value of S1. The changed symbol sequence S of the complex symbol sequence S2 is represented as $\sqrt{P2} \cdot [(-1)^{\lfloor Xstd/2 \rfloor} \cdot x2 + (-1)^{\lfloor Ystd/2 \rfloor} \cdot y2 \cdot i]$. Power of the symbol sequence S is the same as the power of S2. FIG. 10 is a schematic diagram of a process of performing changing processing on a QPSK signal of a center user according to an example embodiment of the disclosure. As shown in FIG. 10, when the symbol Sstd is 1+i, that is, Xstd=1 and Ystd=1, S is $\sqrt{P2} \cdot (x2+y2 \cdot i)$, the same as S2; when the symbol Sstd is −1+i, that is, Xstd=−1 and Ystd=1, S is $\sqrt{P2} \cdot (-x2+y2 \cdot i)$, equivalent to horizontal changing processing over S2; when the symbol Sstd is 1−i, that is, Xstd=1 and Ystd=−1, S is $\sqrt{P2} \cdot (x2-y2 \cdot i)$, equivalent to vertical changing over S2; and when the symbol Sstd is −1−i, that is, Xstd=−1 and Ystd=−1, S is $\sqrt{P2} \cdot (-x2-y2 \cdot i)$, equivalent to 180° changing (both horizontal flipping and vertical flipping) over S2. After a changing step is implemented, superposition processing is required in the next step.

Figure 11:
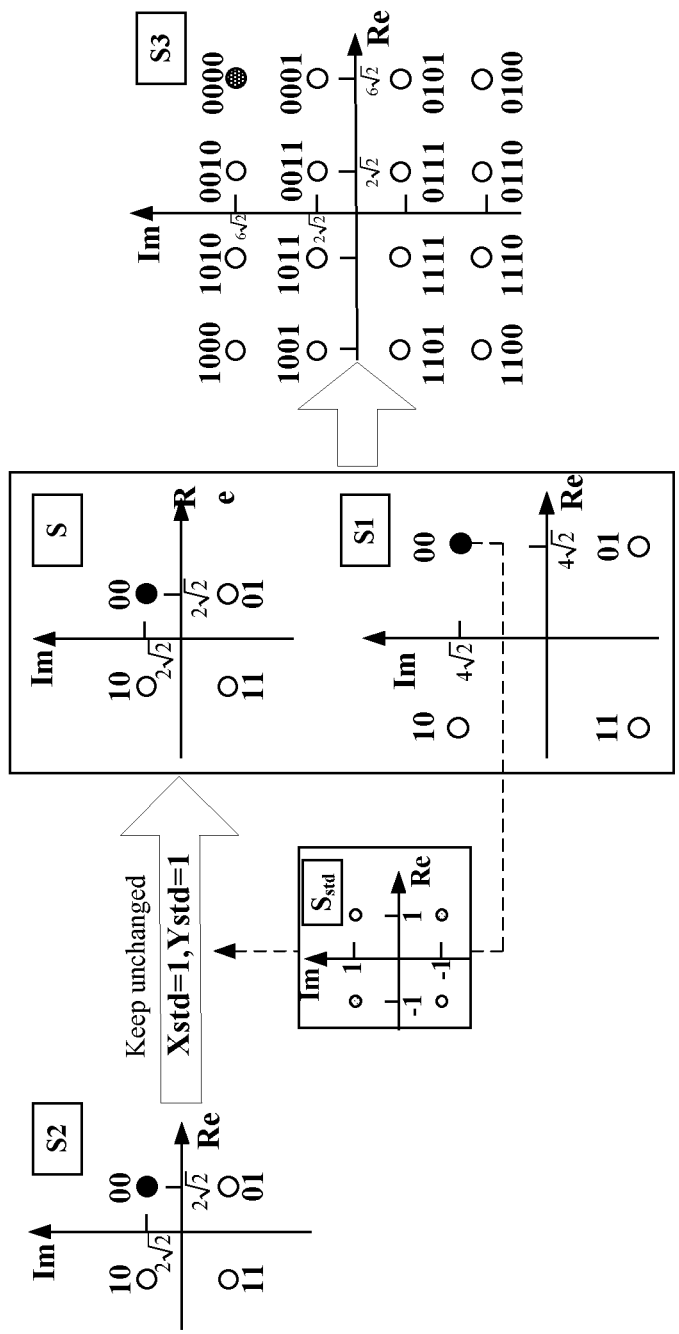
FIG. 11 is a schematic diagram of a superposition process of keeping unchanged after changing processing according to an example embodiment of the disclosure.

FIG. 11 is a schematic diagram of a superposition process of keeping unchanged after changing processing according to an example embodiment of the disclosure. As shown in FIG. 11, a complete superposition flow is as follows:

Step 1: the symbol sequence S2 is changed: from S1, it can be seen that S is $4 \cdot (x2+y2 \cdot i)$, the same as S2, when Sstd is 1+i, that is, Xstd=1 and Ystd=1, that is, S2 is kept unchanged; and Step 2: the symbol sequence S1 is directly superposed with the changed symbol sequence S to obtain the superposed symbol sequence S3.

Figure 12:
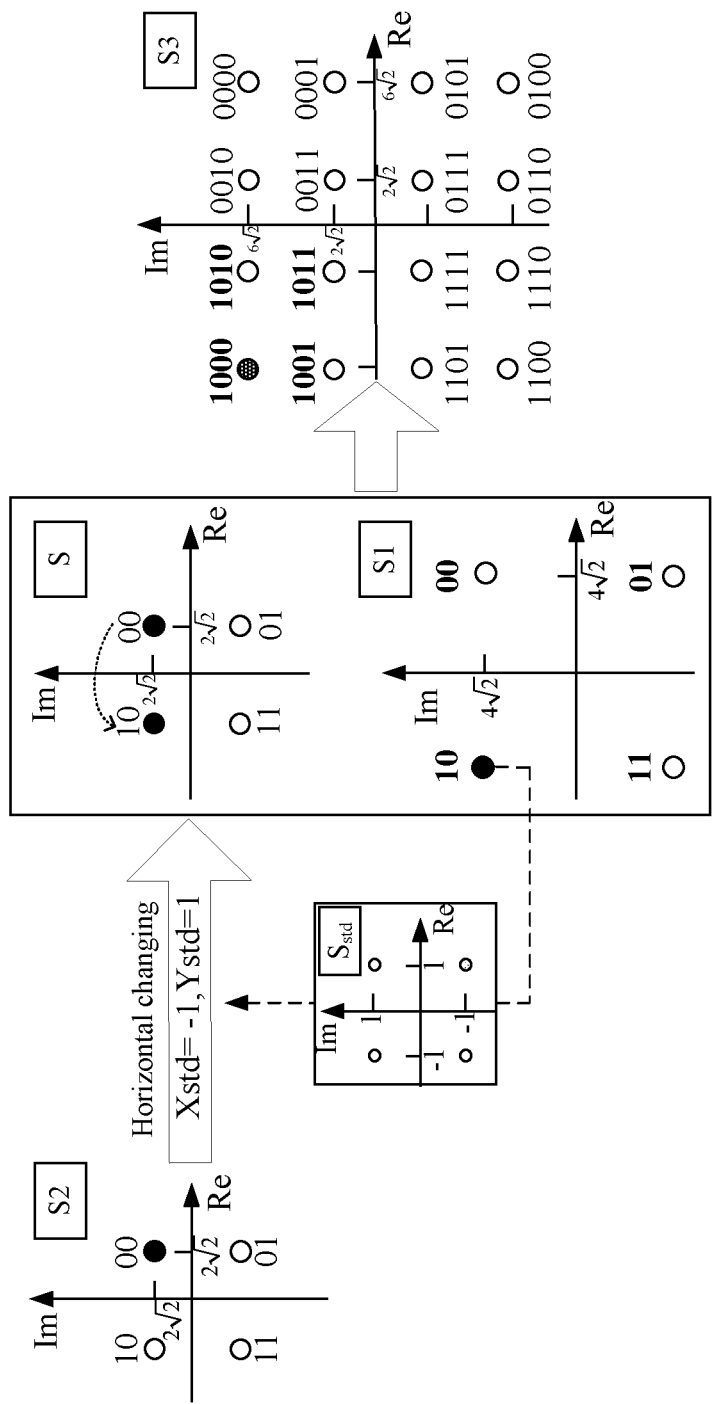
FIG. 12 is a schematic diagram of a superposition process of performing horizontal mapping after changing processing according to an example embodiment of the disclosure.

FIG. 12 is a schematic diagram of a superposition process of performing horizontal flipping after changing processing according to an example embodiment of the disclosure. As shown in FIG. 12, a complete superposition flow is as follows:

Step 1: the symbol sequence S2 is changed: from S1, it can be seen that S is $\sqrt{P2} \cdot (-x2+y2 \cdot i)$, equivalent to horizontal flipping over S2, when Sstd is $-1+i$, that is, Xstd=$-1$ and Ystd=1; and Step 2: the symbol sequence S1 is directly superposed with the changed symbol sequence S to obtain the superposed symbol sequence S3.

Figure 1:
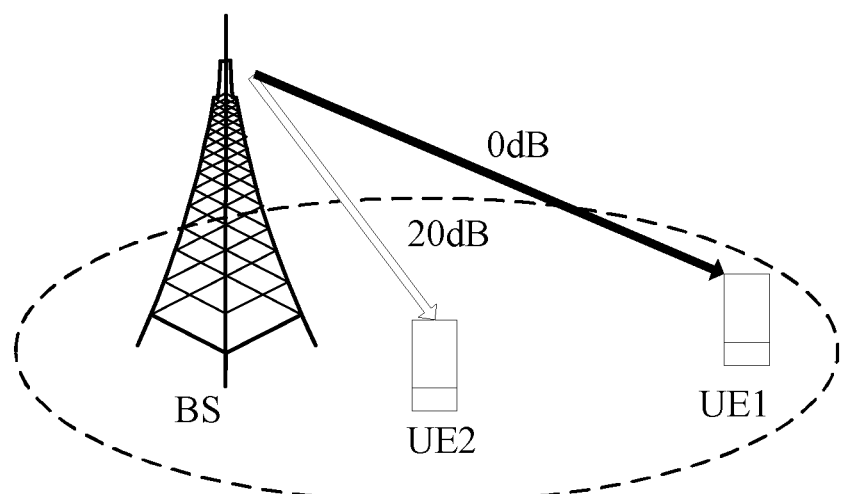
FIG. 1 is a schematic diagram of NOMA downlink broadcasting according to the related art.
Figure 2:
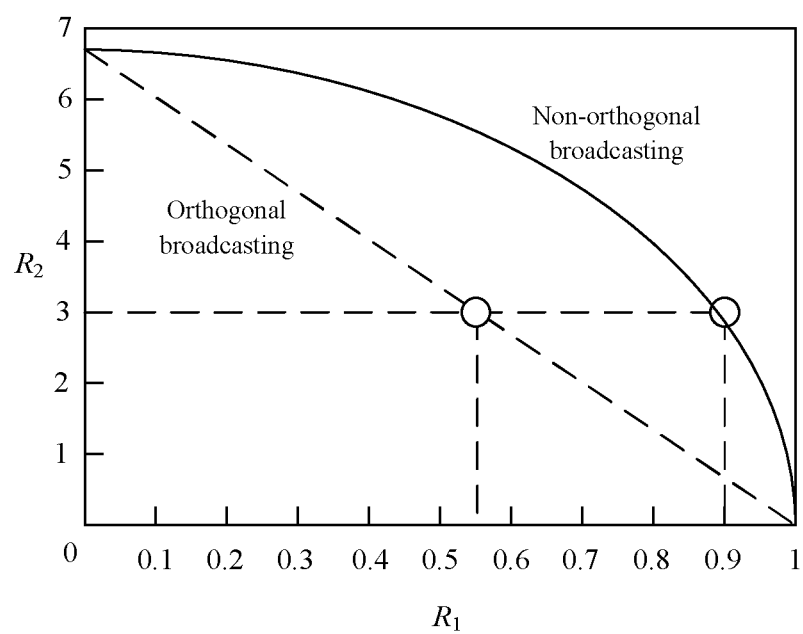
FIG. 2 is a schematic diagram of capacity comparison between an NOMA manner and an OMA manner according to the related art.
Figure 3:
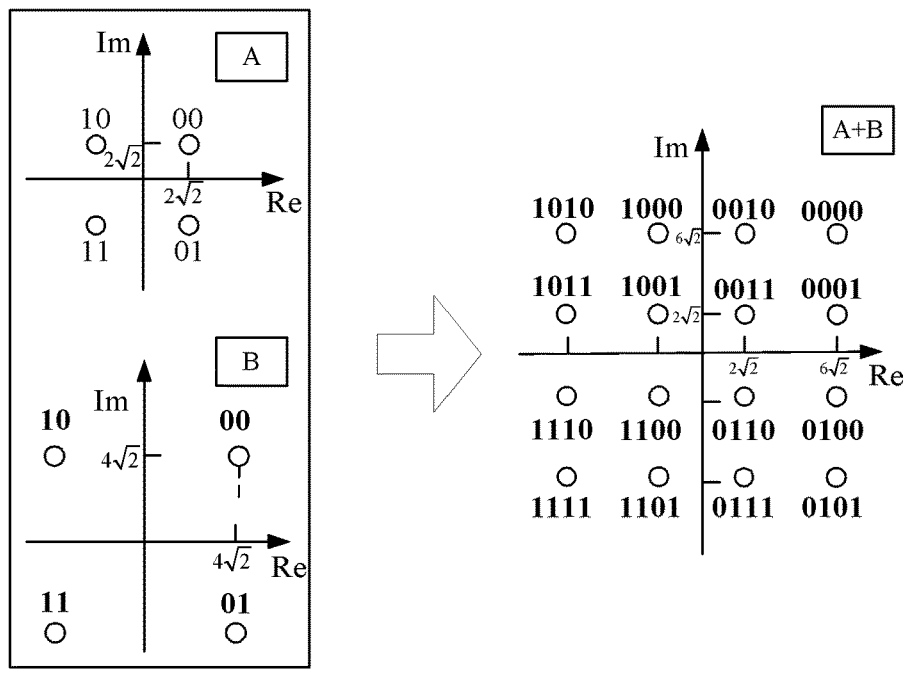
FIG. 3 is a schematic diagram of direct superposition for signals of multiple users according to the related art.

It needs to be noted that: compared with a condition of direct superposition in FIG. 3, the superposed symbol sequence S3 obtained by superposition after changing of the symbol sequence S2 is Gray-mapped, and moreover, more importantly, even though the receivers misjudge the symbol sequence S1 because of noise, the symbol sequence S2 may also be correctly demodulated by performing changing once after the symbol sequence S2 is demodulated, so that performance of a proximal user is obviously improved.

Example Embodiment 5

A sender is required to transmit a first group of information to an edge user and transmit a second group of information to a center user.

At first, two bit information streams coded bits C1 and coded bits C2 are obtained by performing Turbo coding on dual information bit streams to be sent to the users respectively. Coded bits C1 and coded bits C2 are modulated into complex symbol sequences S1 and S2 with certain power, and if a power factor of S1 is $\sqrt{P1}$, a power factor of S2 is $\sqrt{P2}$ and $\sqrt{P1}$ is larger than $\sqrt{P2}$, the complex symbol sequence S1 is $\sqrt{P1} \cdot (x1+y1 \cdot i)$, the complex symbol sequence S2 is $\sqrt{P2} \cdot (x2+y2 \cdot i)$, and an unnormalized integral lattice point constellation symbol Sstd corresponding to S1 is $\sqrt{P1} \cdot (x1+y1 \cdot i)$, the complex symbol sequence S2 is $\sqrt{P2} \cdot (x2+y2 \cdot i)$ and an unnormalized integral lattice point constellation symbol Sstd corresponding to S1 is Xstd+Ystd·i. The unnormalized integral lattice point constellation symbol Sstd is Xstd+Ystd·i, for example: the Xstd value and the Ystd value corresponding to QPSK comprise one of: $\{1,-1\}$, an Xstd value and a Ystd value corresponding to 16 16 QAM comprise one of: $\{1,-1,3,-3\}$ and an Xstd and a Ystd value corresponding to 64 QAM comprise one of: $\{1,-1,3,-3,5,-5,7,-7\}$.

A power allocation component sets the power factors, for example: $\sqrt{P1}$ and $\sqrt{P2}$.

Then, changing and superposition processing of the complex symbol sequences S1 and S2 refers to direct superposition of the complex symbol sequence S1 and a changed symbol sequence S of the complex symbol sequence S2, and a complex symbol sequence S3 obtained by direct superposition may be represented as $\sqrt{P1} \cdot (x1+y1 \cdot i) + \sqrt{P2} \cdot [(-1)^{\lceil Xstd/2 \rceil} \cdot x2 + (-1)^{\lceil Ystd/2 \rceil} \cdot y2 \cdot i]$, wherein the symbol $\lceil \cdot \rceil$ represents rounding up. A constellation of the superposed complex symbol sequence S3 has a Gray attribute, and the constellation of the superposed symbol sequence may be endowed with the Gray attribute by another method.

Figure 13:
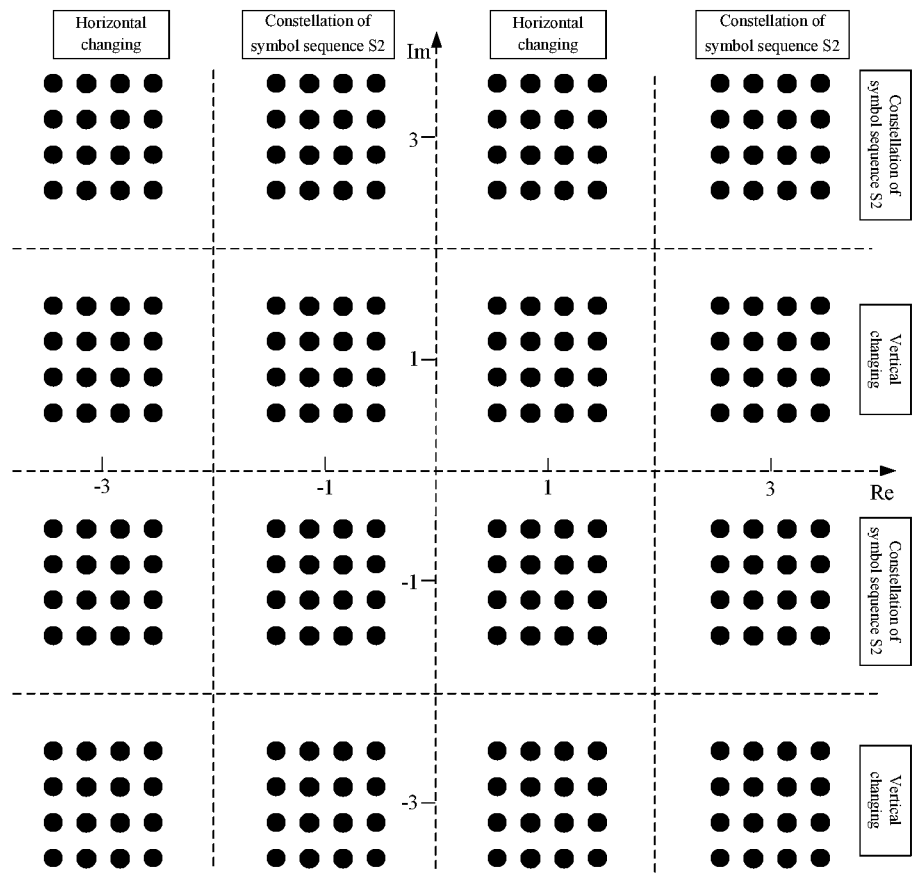
FIG. 13 is a schematic diagram of a process of changing a 16 QAM signal of a center user according to an example embodiment of the disclosure.

16 QAM is adopted for both of the two groups of information according to a standard, at least one real symbol of S is determined according to a real value of S1 and at least one imaginary symbol of S is determined according to an imaginary value of S1. The changed symbol sequence S of the complex symbol sequence S2 is represented as $\sqrt{P2} \cdot [(-1)^{\lceil Xstd/2 \rceil} \cdot x2 + (-1)^{\lceil Ystd/2 \rceil} \cdot y2 \cdot i]$. Power of the symbol sequence S is the same as the power of S2. FIG. 13 is a schematic diagram of a process of changing a 16 QAM signal of a center user according to an example embodiment of the disclosure. As shown in FIG. 13, S2 is correspondingly changed corresponding to conditions of 16 points of S1, and in a transverse direction, S obtained by changing S2 respectively on transverse adjacent points of S1 forms a horizontal flipping relationship, and in a longitudinal direction, S obtained by changing S2 respectively on longitudinal adjacent points of S1 forms a vertical flipping relationship. For example, when the symbol Sstd is 3+3i, that is, Xstd=3 and Ystd=3, S is $\sqrt{P2} \cdot (x2+y2 \cdot i)$, the same as S2; when the symbol Sstd is 1+3i, that is, Xstd=1 and Ystd=3, S is $\sqrt{P2} \cdot (-x2+y2 \cdot i)$, equivalent to horizontal flipping over S2; when the symbol Sstd is 1+1i, that is, Xstd=1 and Ystd=1, S is $\sqrt{P2} \cdot (-x2-y2 \cdot i)$, equivalent to 180° changing (both vertical flipping and horizontal flipping) over S2; and the other conditions are similar.

Figure 14:
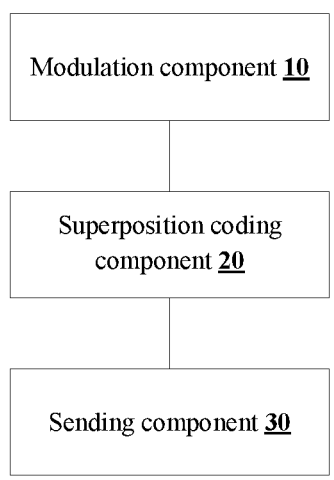
FIG. 14 is a structural block diagram of a device for multiuser superposition transmission according to an embodiment of the disclosure.

FIG. 14 is a structural block diagram of a device for multiuser superposition transmission according to an embodiment of the disclosure. As shown in FIG. 14, the superposition device for multiuser information transmission may include: a modulation component 10, arranged to respectively modulate two bit information streams into a first complex symbol sequence and a second complex symbol sequence; a superposition component 20, arranged to perform superposition processing on the first complex symbol sequence and the second complex symbol sequence to generate a third complex symbol sequence, wherein the third complex symbol sequence has a Gray mapping attribute; and a sending component 30, arranged to form a sending signal according to the third complex symbol sequence, and send the sending signal to multiple receivers.

By adopting the device shown in FIG. 14, the problem that a constellation point finally combined by directly adding signals of multiple users does not have the Gray mapping attribute in the related art is solved. An SIC receiver in an NOMA downlink broadcasting communication system is further simplified, so that the receiver may perform symbol-level SIC demodulation as much as possible. Meanwhile, superposed symbols have the Gray attribute. Moreover, different power may be simply and flexibly allocated to different data streams, and multiple access performance is improved.

Figure 15:
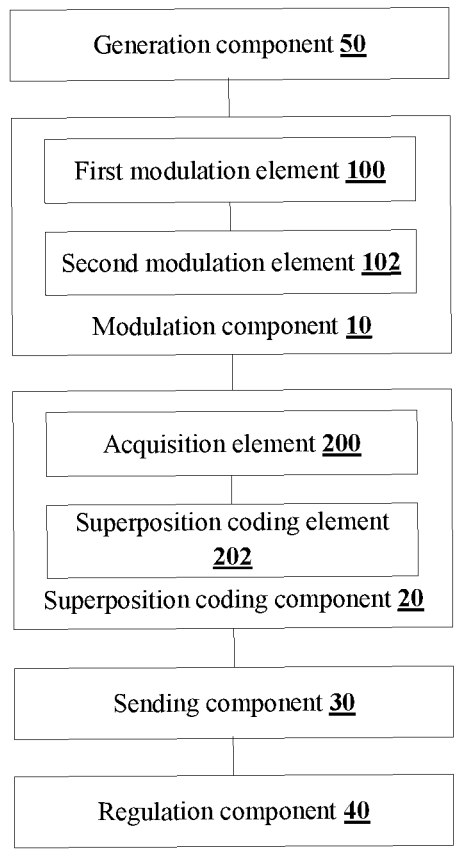
FIG. 15 is a structural block diagram of a device for multiuser superposition transmission according to an example embodiment of the disclosure.

In an example embodiment, as shown in FIG. 15, the modulation component 10 may include: a first modulation element 100, arranged to multiply a power-normalized modulated symbol sequence, which is obtained by performing a power normalization constellation diagram modulation on a first information stream in the two bit information streams, by a first power factor to obtain the first complex symbol sequence; and a second modulation element 102, arranged to multiply a power-normalized modulated symbol sequence, which is obtained by performing the power normalization constellation diagram modulation on a second information stream in the two bit information streams by a second power factor to obtain the second complex symbol sequence, wherein a length of the first complex symbol sequence includes 1, a length of the second complex symbol sequence includes 1, the first power factor is greater than the second power factor, and a modulation order of the first complex symbol sequence is lower than or equal to a modulation order of the second complex symbol sequence.

In an example embodiment, as shown in FIG. 15, the superposition component 20 may include: an acquisition element 200, arranged to change, according to the first complex symbol sequence, an argument of the second complex symbol sequence in a complex plane and keep an amplitude unchanged to acquire a changed symbol sequence; and a superposition element 202, arranged to perform superposition processing on the first complex symbol sequence and the changed symbol sequence to generate the third complex symbol sequence.

In an example embodiment, the acquisition element 200 may include: a first acquisition subelement (not shown in the figure), arranged to determine at least one real symbol of the changed symbol sequence according to a real value of the first complex symbol sequence; and a second acquisition subelement (not shown in the figure), arranged to determine at least one imaginary symbol of the changed symbol sequence according to an imaginary value of the first complex symbol sequence.

In an example embodiment, the superposition element 202 is arranged to perform superposition processing on the first complex symbol sequence and the changed symbol sequence to generate the third complex symbol sequence, including one of the following manners:

a first manner: the third complex symbol sequence is $\sqrt{P1}\cdot(x1+y1\cdot i)+\sqrt{P2}\cdot[(-1)^{\lceil Xstd/2 \rceil}\cdot x2+(-1)^{\lceil Ystd/2 \rceil}\cdot y2\cdot i]$; and a second manner: the third complex symbol sequence is $\sqrt{P1}\cdot(x1+y1\cdot i)+\sqrt{P2}\cdot[(-1)^{\lfloor Xstd/2 \rfloor}\cdot x2+(-1)^{\lfloor Ystd/2 \rfloor}\cdot y2\cdot i]$, wherein $\sqrt{P1}\cdot(x1+y1\cdot i)$ is the first complex symbol sequence, $\sqrt{P2}\cdot(x2+y2\cdot i)$ is the second complex symbol sequence, $\sqrt{P2}\cdot[(-1)^{\lceil Xstd/2 \rceil}\cdot x2+(-1)^{\lceil Ystd/2 \rceil}\cdot y2\cdot i]$ or $\sqrt{P2}\cdot[(-1)^{\lfloor Xstd/2 \rfloor}\cdot x2+(-1)^{\lfloor Ystd/2 \rfloor}\cdot y2\cdot i]$ is the changed symbol sequence, $Xstd+Ystd\cdot i$ is an unnormalized integral lattice point constellation symbol corresponding to the first complex symbol sequence, and includes: an Xstd value corresponding to BPSK comprises one of: $\{1,-1\}$ and a Ystd value corresponding to the BPSK is 0, an Xstd value and a Ystd value corresponding to QPSK comprise one of: $\{1,-1\}$, an Xstd value and a Ystd value corresponding to 16 16 QAM comprise one of: $\{1,-1,3,-3\}$ and an Xstd and a Ystd value corresponding to 64 QAM comprise one of: $\{1,-1,3,-3,5,-5,7,-7\}$, $\sqrt{P1}$ is the first power factor, $\sqrt{P2}$ is the second power factor, $\lceil \cdot \rceil$ represents rounding up, and $\lfloor \cdot \rfloor$ represents rounding down.

In an example embodiment, as shown in FIG. 15, the device may further include: a regulation component 40, arranged to regulate the third complex symbol sequence by regulating at least one of the first power factor and the second power factor; or, regulate a constellation diagram mapped by the third complex symbol sequence by regulating at least one of the first power factor and the second power factor.

In an example embodiment, as shown in FIG. 15, the device may further include: a generation component 50, arranged to determine, according to a channel condition, a coding and modulation manner to perform coding processing on two user information streams to generate the two bit information streams, wherein a protection priority of a first user information stream in the two information streams is higher than a protection priority of a second user information stream in the two user information streams.

Figure 16:
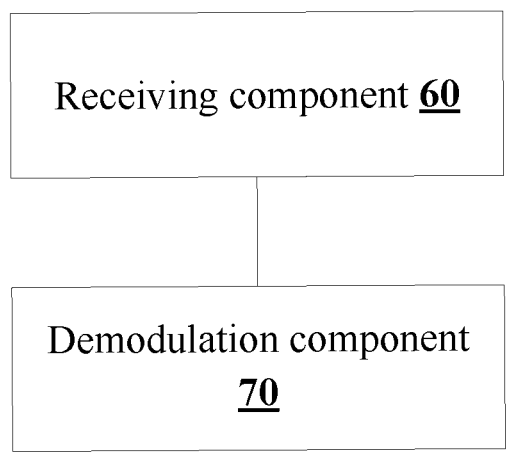
FIG. 16 is a structural block diagram of a device for demodulating multiuser information transmission according to an embodiment of the disclosure.

FIG. 16 is a structural block diagram of a device for demodulating multiuser information transmission according to an embodiment of the disclosure. As shown in FIG. 16, the demodulation device for multiuser information transmission may include: a receiving component 60, arranged to receive a sending signal from a sender, wherein the sending signal is formed according to a third complex symbol sequence after two bit information streams are respectively modulated into a first complex symbol sequence and a second complex symbol sequence and superposition processing is performed on the first complex symbol sequence and the second complex symbol sequence to generate the third complex symbol sequence on the sender, and the third complex symbol sequence has a Gray mapping attribute; and a demodulation component 70, arranged to demodulate the received signal according to a demodulation manner corresponding to a type of a user.

Figure 17:
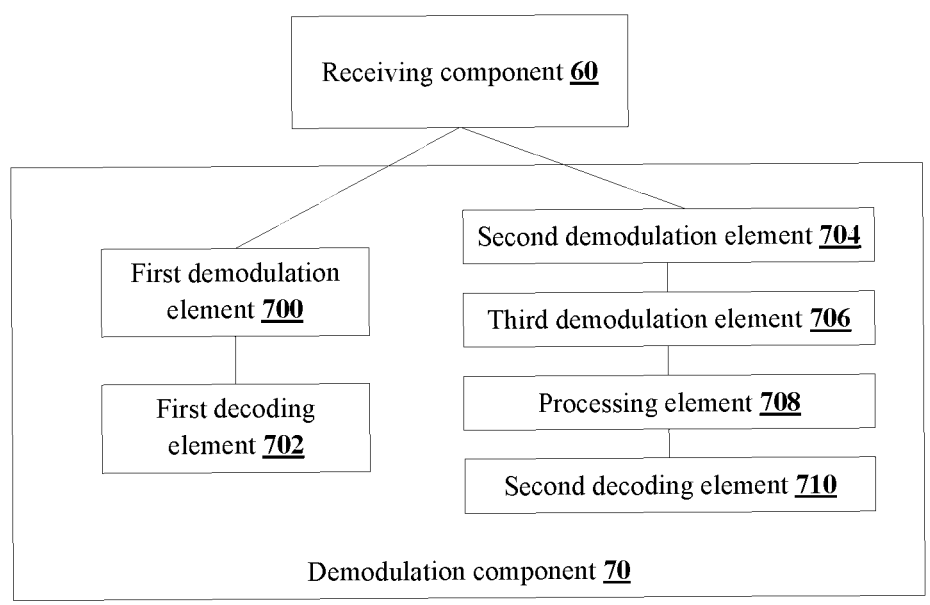
FIG. 17 is a structural block diagram of a device for demodulating multiuser information transmission according to an example embodiment of the disclosure.

In an example embodiment, as shown in FIG. 17, the demodulation component 70 may include: a first demodulation element 700, arranged to, when determining the type of the user is an edge user in a cell, demodulate a first part of signal to be sent to the edge user in the cell from the received signal containing an interference signal; and a first decoding element 702, arranged to decode user information corresponding to the edge user in the cell from the first part of signal.

In an example embodiment, as shown in FIG. 17, the demodulation component 70 may include: a second demodulation element 704, arranged to, when determining the type of the user is a center user in the cell, directly demodulate a first part of signal to be sent to an edge user in the cell from the received signal containing an interference signal; a third demodulation element 706, arranged to remove the first part of signal in the received signal, and demodulate a second part of signal to be sent to the center user in the cell from a rest part of signal; a processing element 708, arranged to change, according to the first part of signal, an argument of the second part of signal in a complex plane and keep an amplitude unchanged to obtain a changed second part of signal; and a second decoding element 710, arranged to decode user information corresponding to the center user in the cell from the changed second part of signal.

In an example implementation process, a time-frequency resource of a channel used for transmitting the sending signal is the same and overlapped for use.

From the above, it can be seen that the embodiments achieve the following technical effects (it need to be noted that some effects are effects which may be achieved by some preferred embodiments): by adopting the technical solutions provided by the embodiments of the disclosure, an SIC receiver in an NOMA downlink broadcasting communication system is simplified, so that the receiver may perform symbol-level SIC demodulation as much as possible; meanwhile, superposed symbols have the Gray attribute; and moreover, different power may be simply and flexibly allocated to different data streams, and multiple access performance is improved.

Obviously, those skilled in the art should know that each component or each step of the disclosure may be implemented by a universal computing device, and the components or steps may be concentrated on a single computing device or distributed on a network formed by a plurality of computing devices, and may optionally be implemented by program codes executable for the computing devices, so that the components or steps may be stored in a storage device for execution with the computing devices, the shown or described steps may be executed in sequences different from those described here in some circumstances, or may form each integrated circuit component respectively, or multiple components or steps therein may form a single integrated circuit component for implementation. As a consequence, the disclosure is not limited to any specific hardware and software combination.

The above are only the example embodiments of the disclosure and not intended to limit the disclosure. For those skilled in the art, the disclosure may have various modifications and variations. Any modifications, equivalent replacements, improvements and the like made within the spirit and principle of the disclosure shall fall within the scope of protection of the disclosure.

INDUSTRIAL APPLICABILITY

As mentioned above, the method and device for multiuser superposition transmission and the method and device for demodulating multiuser information transmission provided by the embodiments of the disclosure have the following beneficial effects: an SIC receiver in an NOMA downlink broadcasting communication system is simplified, so that the receiver may perform symbol-level SIC demodulation as much as possible; meanwhile, superposed symbols have the Gray attribute; and moreover, different power may be simply and flexibly allocated to different data streams, and multiple access performance is improved.

What is claimed is:

1. A method for multiuser superposition transmission, comprising:
    respectively modulating two bit information streams into a first complex symbol sequence and a second complex symbol sequence;
    performing superposition processing on the first complex symbol sequence and the second complex symbol sequence to generate a third complex symbol sequence, wherein the third complex symbol sequence has a Gray mapping attribute, and performing, according to the first complex symbol sequence and the second complex symbol sequence, superposition processing to generate the third complex symbol sequence comprises: changing, according to the first complex symbol sequence, an argument of the second complex symbol sequence in a complex plane and keeping an amplitude unchanged to acquire a changed symbol sequence; and performing superposition processing on the first complex symbol sequence and the changed symbol sequence to generate the third complex symbol sequence; and
    forming a sending signal according to the third complex symbol sequence, and sending the sending signal to multiple receivers.

2. The method as claimed in claim 1, wherein respectively modulating the two bit information streams into the first complex symbol sequence and the second complex symbol sequence comprises:
    multiplying a power-normalized modulated symbol sequence, which is obtained by performing a power normalization constellation diagram modulation on a first information stream in the two bit information streams, by a first power factor to obtain the first complex symbol sequence; and
    multiplying a power-normalized modulated symbol sequence, which is obtained by performing the power normalization constellation diagram modulation on a second information stream in the two bit information streams, by a second power factor to obtain the second complex symbol sequence,
    wherein a length of the first complex symbol sequence comprises 1, a length of the second complex symbol sequence comprises 1, the first power factor is greater than the second power factor, and a modulation order of the first complex symbol sequence is lower than or equal to a modulation order of the second complex symbol sequence.

3. The method as claimed in claim 1, wherein changing the second complex symbol sequence to acquire the changed symbol sequence comprises:
    determining at least one real symbol of the changed symbol sequence according to a real value of the first complex symbol sequence; and
    determining at least one imaginary symbol of the changed symbol sequence according to an imaginary value of the first complex symbol sequence.

4. The method as claimed in claim 1, wherein the third complex symbol sequence can be presented as one of the followings:
    $\sqrt{P1}\cdot(x1+y1\cdot i)+\sqrt{P2}\cdot[(-1)^{\lfloor Xstd/2 \rfloor}\cdot x2+(-1)^{539\ Ystd/2\rfloor}\cdot y2\cdot i]$;
    and
    $\sqrt{P1}\cdot(x1+y1\cdot i)+\sqrt{P2}\cdot[(-1)^{\lfloor Xstd/2 \rfloor}\cdot x2+(-1)^{537\ Ystd/2\rceil}\cdot y2\cdot i]$,
    wherein $\sqrt{P1}\cdot(x1+y1\cdot i)$ is the first complex symbol sequence, $\sqrt{P2}\cdot(x2+y2\cdot i)$ is the second complex symbol sequence, $\sqrt{P2}\cdot[(-1)^{\lfloor Xstd/2 \rfloor}\cdot x2+(-1)^{539\ Ystd/2\rceil}\cdot y2\cdot i]$ or $\sqrt{P2}\cdot[(-1)^{\lfloor Xstd/2 \rfloor}\cdot x2+(-1)^{537\ Ystd/2\rceil}\cdot y2\cdot i]$ is the changed symbol sequence, $Xstd+Ystd\cdot i$ is an unnormalized integral lattice point constellation symbol corresponding to the first complex symbol sequence, and comprises:
    an Xstd value corresponding to Binary Phase Shift Keying (BPSK) comprises one of: $\{1,-1\}$ and a Ystd value corresponding to the BPSK is 0,
    an Xstd value and a Ystd value corresponding to Quadrature Phase Shift Keying (QPSK) comprise one of: $\{1,-1\}$,
    an Xstd value and a Ystd value corresponding to 16 Quadrature Amplitude Modulation (16QAM) comprise one of: $\{1,-1,3,-3\}$ and
    an Xstd and a Ystd value corresponding to 64QAM comprise one of: $\{1,-1,3,-3,5,-5,7,-7\}$,
    $\sqrt{P1}$ is the first power factor, $\sqrt{P2}$ is the second power factor, $\lceil \cdot \rceil$ rounding up, and $\lfloor \cdot \rfloor$ represents rounding down.

5. The method as claimed in claim 2, wherein the method further comprises:
    regulating the third complex symbol sequence by regulating at least one of the first power factor and the second power factor; or,
    regulating a constellation diagram mapped by the third complex symbol sequence by regulating at least one of the first power factor and the second power factor.

6. The method as claimed in claim 2, wherein, before respectively modulating the two bit information streams into the first complex symbol sequence and the second complex symbol sequence, the method further comprises:
    determining, according to a channel condition, a coding and modulation manner to perform coding processing on two user information streams to generate the two bit information streams, wherein a protection priority of a first user information stream in the two user information streams is higher than a protection priority of a second user information stream in the two user information streams.

7. A method for demodulating multiuser information transmission, comprising:
    receiving a sending signal from a sender, wherein the sending signal is formed according to a third complex symbol sequence, the third complex symbol sequence is generated on the sender in a following manner: two bit information streams are respectively modulated into a first complex symbol sequence and a second complex symbol sequence, a changed symbol sequence is acquired by changing, according to the first complex symbol sequence, an argument of the second complex symbol sequence in a complex plane and keeping an amplitude unchanged, -and superposition processing is performed on the first complex symbol sequence and the changed complex symbol sequence to generate the third complex symbol sequence, and the third complex symbol sequence has a Gray mapping attribute; and demodulating the received signal according to a demodulation manner corresponding to a type of a user.

8. The method as claimed in claim 7, wherein demodulating the received signal according to the demodulation manner corresponding to the type of the user comprises:
when determining the type of the user is an edge user in a cell, demodulating a first part of signal to be sent to the edge user in the cell from the received signal containing an interference signal; and
decoding user information desired for the edge user in the cell from the first part of signal.

9. The method as claimed in claim 7, wherein demodulating the received signal according to the demodulation manner corresponding to the type of the user comprises:
when determining the type of the user is a center user in the cell, demodulating a first part of signal to be sent to an edge user in the cell from the received signal containing an interference signal;
removing the first part of signal in the received signal, and demodulating a second part of signal to be sent to the center user in the cell from a rest part of signal;
changing, according to the first part of signal, an argument of the second part of signal in a complex plane and keeping an amplitude unchanged to obtain a changed second part of signal; and
decoding user information corresponding to the center user in the cell from the changed second part of signal.

10. The method as claimed in claim 7, wherein a time-frequency resource of a channel used for transmitting the sending signal is the same and overlapped.

11. A device for multiuser superposition transmission, comprising:
a modulation component, arranged to respectively modulate two bit information streams into a first complex symbol sequence and a second complex symbol sequence;
a superposition component, arranged to perform superposition processing on the first complex symbol sequence and the second complex symbol sequence to generate a third complex symbol sequence, wherein the third complex symbol sequence has a Gray mapping attribute, and the superposition component comprises: an acquisition element, arranged to change, according to the first complex symbol sequence, an argument of the second complex symbol sequence in a complex plane and keep an amplitude unchanged to acquire a changed symbol sequence; and a superposition element, arranged to perform superposition processing on the first complex symbol sequence and the changed symbol sequence to generate the third complex symbol sequence; and
a sending component, arranged to form a sending signal according to the third complex symbol sequence, and send the sending signal to multiple receivers.

12. The device as claimed in claim 11, wherein the modulation component comprises:
a first modulation element, arranged to multiply a power-normalized modulated symbol sequence, which is obtained by performing a power normalization constellation diagram modulation on a first information stream in the two bit information streams, by a first power factor to obtain the first complex symbol sequence; and
a second modulation element, arranged to multiply a power-normalized modulated symbol sequence, which is obtained by performing the power normalization constellation diagram modulation on a second information stream in the two bit information streams, by a second power factor to obtain the second complex symbol sequence,
wherein a length of the first complex symbol sequence comprises 1, a length of the second complex symbol sequence comprises 1, the first power factor is greater than the second power factor, and a modulation order of the first complex symbol sequence is lower than or equal to a modulation order of the second complex symbol sequence.

13. The device as claimed in claim 11, wherein the acquisition element comprises:
a first acquisition subelement, arranged to determine at least one real symbol of the changed symbol sequence according to a real value of the first complex symbol sequence; and
a second acquisition subelement, arranged to determine at least one imaginary symbol of the changed symbol sequence according to an imaginary value of the first complex symbol sequence.

14. The device as claimed in claim 11, wherein the third complex symbol sequence can be presented as one of the followings:
$\sqrt{P1} \cdot (x1+y1 \cdot i) + \sqrt{P2} \cdot [(-1)^{\lceil Xstd/2 \rceil} \cdot x2 + (-1)^{539\ Ystd/2 \rceil} \cdot y2 \cdot i]$; and
$\sqrt{P1} \cdot (x1+y1 \cdot i) + \sqrt{P2} \cdot [(-1)^{\lfloor Xstd/2 \rfloor} \cdot x2 + (-1)^{537\ Ystd/2 \rfloor} \cdot y2 \cdot i]$,
wherein $\sqrt{P1} \cdot (x1+y1 \cdot i)$ is the first complex symbol sequence, $\sqrt{P2} \cdot (x2+y2 \cdot i)$ is the second complex symbol sequence, $\sqrt{P2} \cdot [(-1)^{\lceil Xstd/2 \rceil} \cdot x2 + (-1)^{539\ Ystd/2 \rceil} \cdot y2 \cdot i]$ or $\sqrt{P2} \cdot [(-1)^{\lfloor Xstd/2 \rfloor} \cdot x2 + (-1)^{537\ Ystd/2 \rfloor} \cdot y2 \cdot i]$ is the changed symbol sequence, $Xstd + Ystd \cdot i$ is an unnormalized integral lattice point constellation symbol corresponding to the first complex symbol sequence, and comprises:
an Xstd value corresponding to Binary Phase Shift Keying (BPSK) comprises one of: {1,-1} and a Ystd value corresponding to the BPSK is 0,
an Xstd value and a Ystd value corresponding to Quadrature Phase Shift Keying (QPSK) comprise one of: {1,-1},
an Xstd value and a Ystd value corresponding to 16 Quadrature Amplitude Modulation (16QAM) comprise one of: {1,-1,3,-3} and
an Xstd and a Ystd value corresponding to 64QAM comprise one of: {1, -1,3, -3,5,-5,7,-7},
$\sqrt{P1}$ is the first power factor, $\sqrt{P2}$ is the second power factor, $\lceil \cdot \rceil$ rounding up, and $\lfloor \cdot \rfloor$ represents rounding down.

15. The device as claimed in claim 12, wherein the device further comprises:
a regulation component, arranged to regulate the third complex symbol sequence by regulating at least one of the first power factor and the second power factor; or, regulate a constellation diagram mapped by the third complex symbol sequence by regulating at least one of the first power factor and the second power factor;
or the device further comprises: a generation component, arranged to determine, according to a channel condition, a coding and modulation manner to perform coding processing on two user information streams to generate the two bit information streams, wherein a protection priority of a first user information stream in the two user information streams is higher than a protection priority of a second user information stream in the two user information streams.

16. A demodulation device for multiuser information transmission, comprising:

a receiving component, arranged to receive a sending signal from a sender, wherein the sending signal is formed according to a third complex symbol sequence, the third complex symbol sequence is generated on the sender in a following manner: two bit information streams are respectively modulated into a first complex symbol sequence and a second complex symbol sequence, a changed symbol sequence is acquired by changing, according to the first complex symbol sequence, an argument of the second complex symbol sequence in a complex plane and keeping an amplitude unchanged, and superposition processing is performed on the first complex symbol sequence and the changed complex symbol sequence to generate the third complex symbol sequence, and the third complex symbol sequence has a Gray mapping attribute; and a demodulation component, arranged to demodulate the received signal according to a demodulation manner corresponding to a type of a user.

17. The device as claimed in claim 16, wherein the demodulation component comprises:

a first demodulation element, arranged to, when determining the type of the user is an edge user in a cell, demodulate a first part of signal to be sent to the edge user in the cell from the received signal containing an interference signal; and a first decoding element, arranged to decode user information corresponding to the edge user in the cell from the first part of signal;

or the demodulation component comprises: a second demodulation element, arranged to, when determining the type of the user is a center user in the cell, demodulate a first part of signal to be sent to an edge user in the cell from the received signal containing an interference signal; a third demodulation element, arranged to remove the first part of signal in the received signal, and demodulate a second part of signal to be sent to the center user in the cell from a rest part of signal; a processing element, arranged to change, according to the first part of signal, an argument of the second part of signal in a complex plane and keep an amplitude unchanged to obtain a changed second part of signal; and a second decoding element, arranged to decode user information corresponding to the center user in the cell from the changed second part of signal.

18. The device as claimed in claim 16, wherein a time-frequency resource of a channel used for transmitting the sending signal is the same and overlapped for use.

* * * * *